US011544777B2

United States Patent
Silberstein et al.

(10) Patent No.: US 11,544,777 B2
(45) Date of Patent: Jan. 3, 2023

(54) METHOD, DEVICE, AND NON-TRANSITORY MACHINE READABLE MEDIUM FOR FEEDBACK BASED ITEM SELECTION AND TRANSMISSION

(71) Applicant: Oath Inc., New York, NY (US)

(72) Inventors: Natalia Silberstein, Haifa (IL); Oren Shlomo Somekh, Cfar-Neter (IL); Yair Koren, Haifa (IL); Michal Aharon, Haifa (IL); Tingyi Wu, Sunnyvale, CA (US); Dror Porat, Tel Aviv (IL)

(73) Assignee: YAHOO AD TECH LLC, Dulles, VA (US)

( * ) Notice: Subject to any disclaimer, the term of this patent is extended or adjusted under 35 U.S.C. 154(b) by 676 days.

(21) Appl. No.: 16/505,916

(22) Filed: Jul. 9, 2019

(65) Prior Publication Data

US 2021/0012415 A1    Jan. 14, 2021

(51) Int. Cl.
*G06Q 30/00* (2012.01)
*G06Q 30/08* (2012.01)
*G06F 17/18* (2006.01)

(52) U.S. Cl.
CPC .............. *G06Q 30/08* (2013.01); *G06F 17/18* (2013.01)

(58) Field of Classification Search
None
See application file for complete search history.

(56) References Cited

U.S. PATENT DOCUMENTS

2012/0303415 A1* 11/2012 Edelson ............. G06Q 30/0282
705/7.32
2018/0150886 A1* 5/2018 Wang ................. G06Q 30/0275

OTHER PUBLICATIONS

Dai, Wei, Transfer to Rank for Top-N Recommendation, Jan. 11, 2019, IEEE Transactions on Big Data, vol. 6, issue 4, pp. 770-779 (Year: 2019).*
Dai, Wei, Transfer to Rank to Top-N Recommendation, Jan. 11, 2019, IEEE Transactions on Big Data, vol. 6, issue 4, pp. 770-779 (Year: 2019).*

* cited by examiner

*Primary Examiner* — Jeffrey A. Smith
*Assistant Examiner* — Timothy J Kang
(74) *Attorney, Agent, or Firm* — Cooper Legal Group LLC

(57) ABSTRACT

One or more computing devices, systems, and/or methods for selecting content items for transmission to client devices are provided. A request for content associated with a client device may be received. Bid values and/or click probabilities associated with content items may be determined. A probability of receiving a negative signal associated with a content item of the content items from the client device responsive to presenting the content item via the client device may be determined based upon a user profile associated with the client device. A content item score, of content item scores associated with the content items, may be generated based upon the probability, a click probability and/or a bid value associated with the content item. The content item may be selected from the content items for presentation via the client device based upon the content item scores. The content item may be transmitted to the client device.

20 Claims, 11 Drawing Sheets

METHOD, DEVICE, AND NON-TRANSITORY MACHINE READABLE MEDIUM FOR FEEDBACK BASED ITEM SELECTION AND TRANSMISSION

BACKGROUND

Many services, such as websites, applications, etc. may provide platforms for viewing media. For example, a user may interact with a service. While interacting with the service, selected media may be presented to the user automatically.

SUMMARY

In accordance with the present disclosure, one or more computing devices and/or methods are provided. In an example, a first content item may be presented via a first client device. A first negative signal associated with the first content item may be received from the first client device. An indication of the first content item may be stored in a first user profile associated with the first client device. The first user profile may be indicative of a plurality of content items associated with negative signals received from the first client device. The first content item may be included in the plurality of content items. A first request for content associated with the first client device may be received. Responsive to receiving the first request for content, a plurality of bid values associated with a second plurality of content items may be determined. The plurality of bid values may comprise a first bid value associated with a second content item of the second plurality of content items and/or a second bid value associated with a third content item of the second plurality of content items. A first probability of receiving a negative signal associated with the second content item from the first client device responsive to presenting the second content item via the first client device may be determined based upon the first user profile. A second probability of receiving a negative signal associated with the third content item from the first client device responsive to presenting the third content item via the first client device may be determined based upon the first user profile. A first click probability associated with the second content item may be determined. The first click probability may correspond to a probability of receiving a positive signal and/or a selection of the second content item responsive to presenting the second content item via the first client device. A second click probability associated with the third content item may be determined. The second click probability may correspond to a probability of receiving a positive signal and/or a selection of the third content item responsive to presenting the third content item via the first client device. A first content item score, of a plurality of content item scores associated with the second plurality of content items, may be generated based upon the first probability, the first click probability and/or the first bid value. The first content item score may be associated with the second content item. A second content item score, of the plurality of content item scores, may be generated based upon the second probability, the second click probability and/or the second bid value. The second content item score may be associated with the third content item. The third content item may be selected from the second plurality of content items for presentation via the first client device based upon the plurality of content item scores. The third content item may be transmitted to the first client device.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
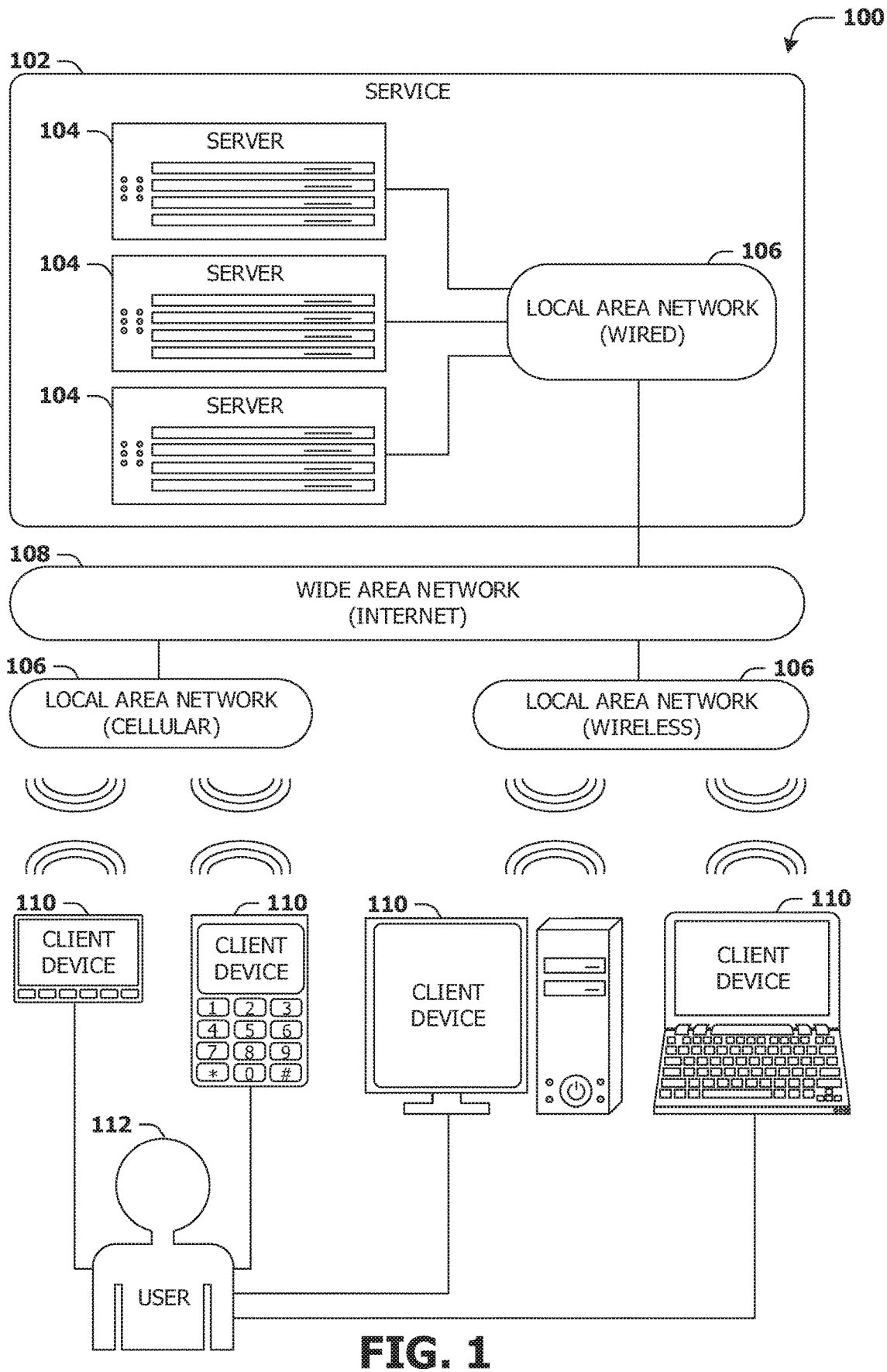
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 (and/or via a wired network) provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
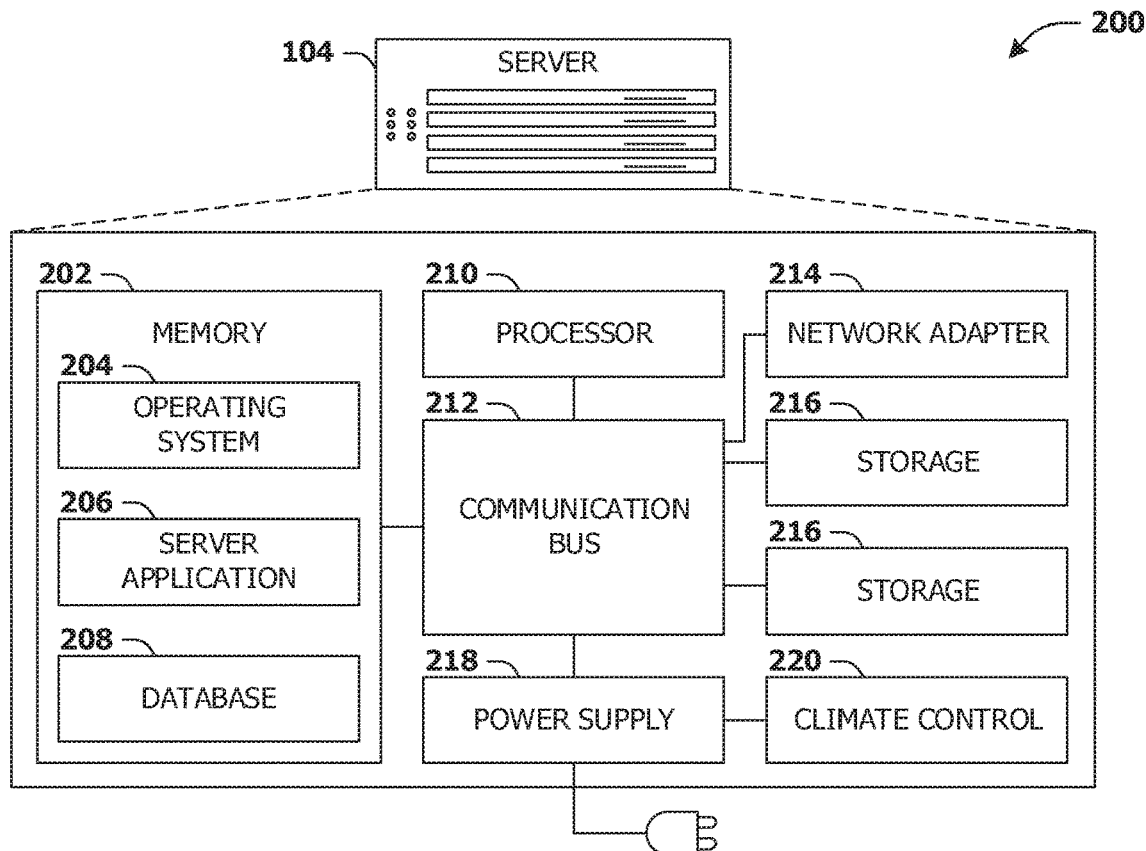
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
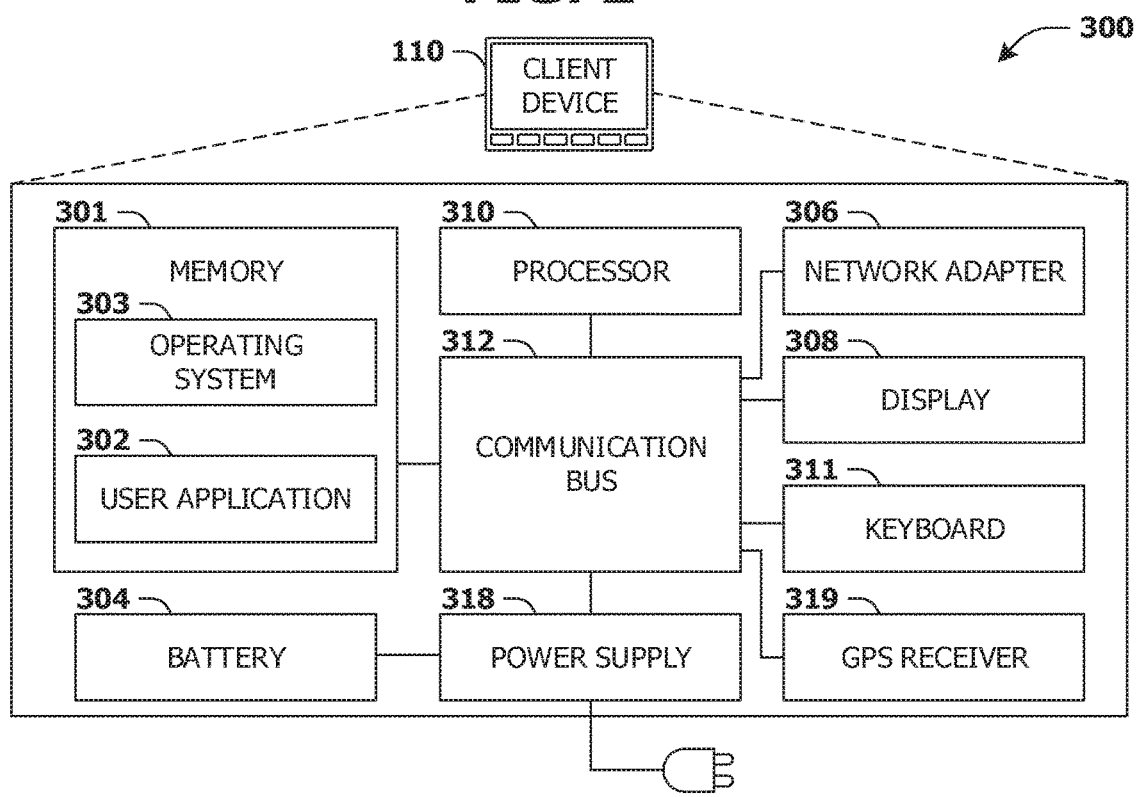
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for selecting content for transmission to devices are provided. For example, a user (and/or a device associated with the user) may access and/or interact with a service, such as a browser, software, a website, an application, an operating system, etc. that provides a platform for viewing and/or downloading content from a server associated with a content system. In some examples, the content system may use user information, such as a user profile comprising activity information (e.g., search history information, website browsing history, email information, etc.), user demographic information, location information, etc. to determine interests of the user. For example, the user profile may be generated based upon information received from the device (and/or one or more other devices associated with the user and/or a user account associated with the user). Alternatively and/or additionally, the user profile may be generated based upon information be received from servers associated with websites visited by the user, servers associated with an email account of the user, etc. A first content item may be selected for transmission to the device based upon the user profile. However, a negative signal associated with the first content item may be received from the device. The negative signal may be indicative of the first content item being closed using the first client device. Alternatively and/or additionally, the first negative signal may be indicative of the user not having an interest in the first content item. The negative signal and/or the first content item being closed using the first client device may be associated with a loss (e.g., a revenue loss) incurred by an entity associated with the content system (e.g., the loss may occur as a result of the first content item being closed and/or the negative signal being received).

Thus, in accordance with one or more of the techniques presented herein, a second request for content may be received from the device. A plurality of bid values associated with a plurality of content items may be determined. The plurality of content items may correspond to content items participating in an auction for selection of a content item to present via the device. A plurality of probabilities of receiving negative signals associated with the plurality of content items may be determined. A probability of the plurality of probabilities may correspond to a probability of receiving a negative signal associated with a content item of the plurality of content items responsive to presenting the content item via the device. A plurality of click probabilities associated with the plurality of content items may be determined. In some examples, a click probability of the plurality of click probabilities may correspond to a probability of receiving a selection of a content item of the plurality of content items responsive to presenting the content item via the device. A plurality of negative signal loss values associated with the plurality of content items may be determined. In some examples, a negative signal loss value of the plurality of negative signal loss values may be indicative of a loss associated with reception of a negative signal associated with a content item of the plurality of content items (e.g., the negative loss value may be indicative of a revenue loss and/or a monetary amount of loss incurred as a result of receiving a negative signal associated with the content item responsive to presenting the content item via the device). A plurality of content item scores may be generated based upon the plurality of bid values, the plurality of probabilities of receiving negative signals, the plurality of click probabilities and/or the plurality of negative signal loss values. A second content item may be selected from the plurality of content item scores for presentation via the device based upon the plurality of content scores. The second content item may be transmitted to the device and/or presented via the device. It may be appreciated that by generating the plurality of content item scores based upon the plurality of probabilities of receiving negative signals, a probability that a negative signal associated with the second content item is received and/or that a loss associated with the negative signal is incurred may be reduced. Thus, a loss (e.g., a revenue loss) incurred as a result of receiving negative signals may be reduced (and/or minimized).

Figure 4A:
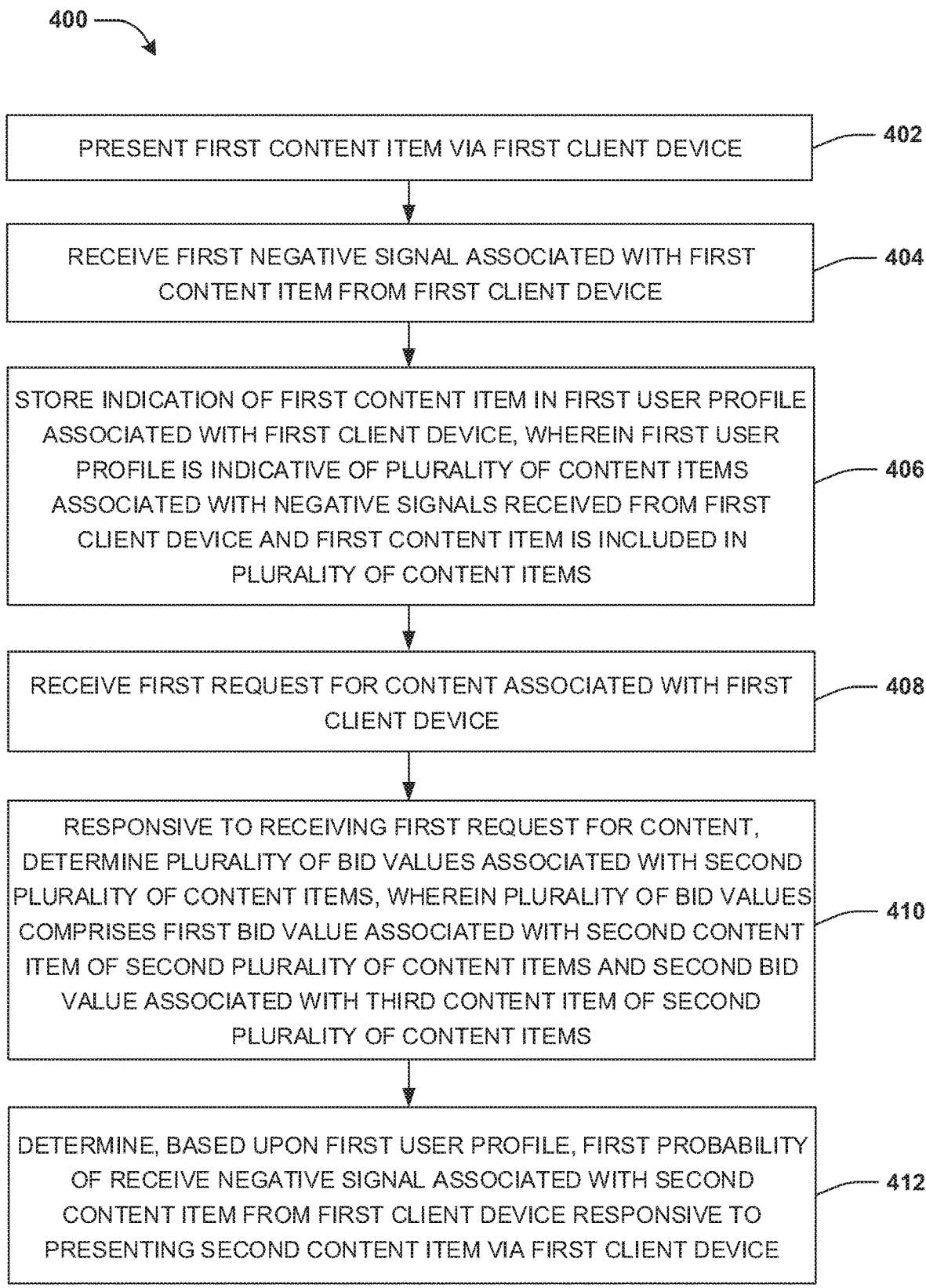
FIG. 4A is a first portion of a flow chart illustrating an example method for selecting content for transmission to devices.
Figure 4B:
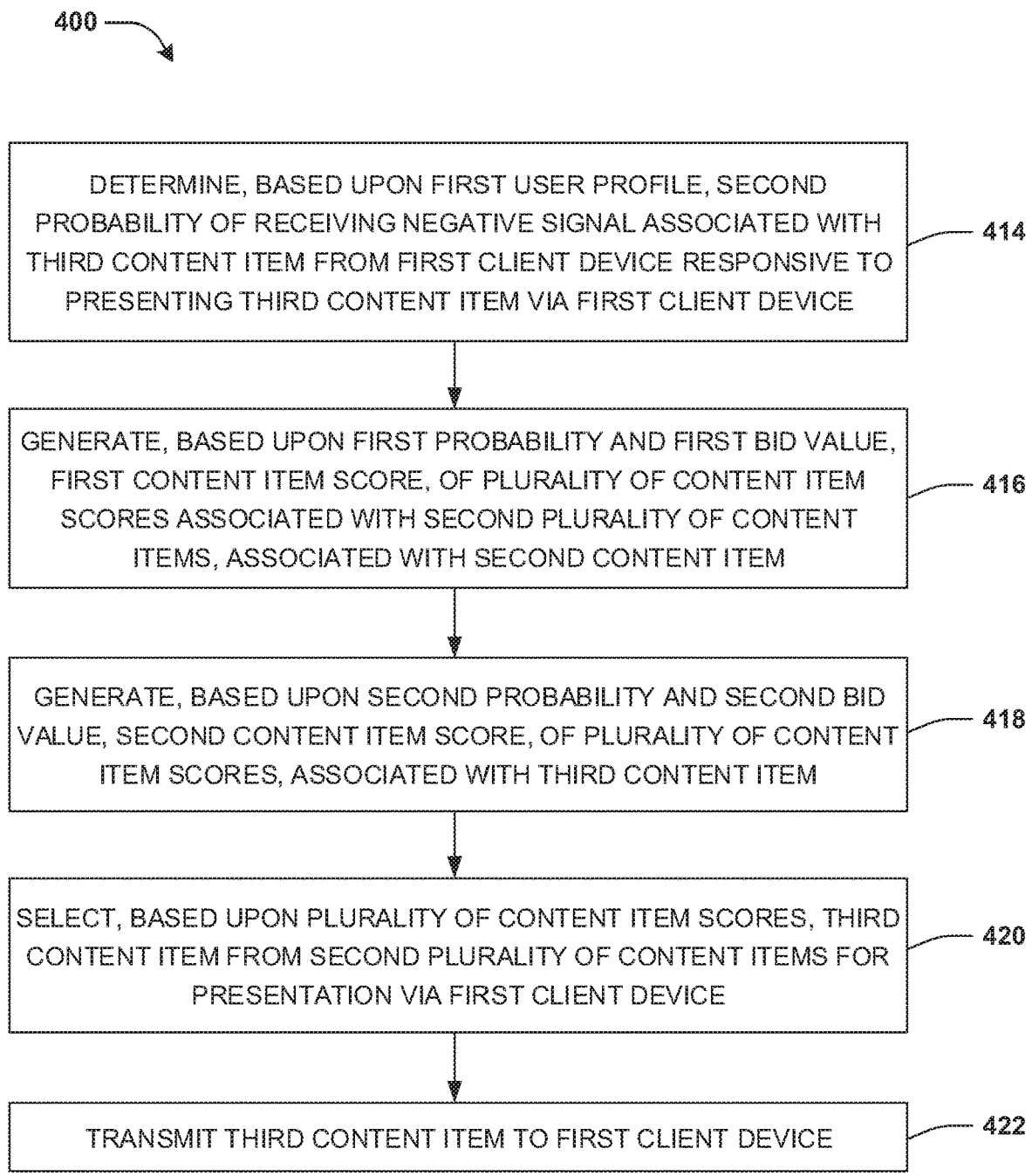
FIG. 4B is a second portion of the flow chart of FIG. 4A illustrating the example method for selecting content for transmission to devices.

An embodiment of selecting content for transmission to devices is illustrated by an example method 400 of FIGS. 4A-4B. A first user, such as user Jill, (and/or a first client device associated with the first user) may access and/or interact with a service, such as a browser, software, a website, an application, an operating system, an email interface, a messaging interface, a music-streaming application, a video application, etc. that provides a platform for viewing and/or downloading content from a server associated with a content system. In some examples, the content system may use user information, such as a first user profile comprising activity information (e.g., search history information, website browsing history, email information, selected content items, etc.), demographic information associated with the first user, location information, etc. to determine interests of the first user and/or select content for presentation to the first user based upon the interests of the first user.

In some examples, the content system may be an advertisement system. Alternatively and/or additionally, the content system may not be an advertisement system. The content system may provide content items to be presented via pages associated with the content system. For example, the pages may be associated with websites (e.g., search engine websites, email service websites, news content websites, communication service websites, video platform websites, multimedia platform websites, etc.) associated with the content system. The content system may provide content items to be presented in (dedicated) locations throughout the pages (e.g., one or more areas of the pages configured for presentation of content items). For example, a content item may be presented at the top of a web page associated with the content system (e.g., within a banner area), at the side of the web page (e.g., within a column), in a pop-up window, overlaying content of the web page, etc. Alternatively and/or additionally, a content item may be presented within an application (e.g., a mobile application) associated with the content system and/or within a game associated with the content system. Alternatively and/or additionally, a user may be required to watch and/or interact with the content item before the user can access content of a web page, utilize resources of an application and/or play a game.

A first request for content, associated with the first client device may be received. In some examples, the first request for content may be received responsive to the first client device accessing an internet resource associated with the content system (e.g., one or more of a web page of a website associated with the content system, an application associated with the content system, an internet game associated with the content system, etc.). For example, the first client device may transmit a request to access the internet resource to a first server associated with the internet resource. Responsive to receiving the request to access the internet resource, the first server associated with the internet resource may transmit the first request for content to the content system (and/or to a second server associated with the content system). Alternatively and/or additionally, the first request for content may be received from the first client device. In some examples, the first request for content may correspond to a request to be provided with a content item (e.g., an advertisement, an image, a link, a video, etc.) for presentation via the internet resource.

In some examples, responsive to receiving the first request for content, a bidding process may be performed to select a content item from a plurality of participating content items participating in an auction for selection of a content item to present via the first client device. In some examples, a first content item may be selected, for presentation via the first client device, from the plurality of participating content items. For example, the first content item may be transmitted to the first client device responsive to selecting the first content item for presentation via the first client device.

At 402, the first content item may be presented via the first client device. For example, the first content item may be presented via the first client device responsive to selecting the first content item for presentation via the first client device and/or responsive to transmitting the first content item to the first client device. In some examples, the first content item may be one or more of an advertisement, an image, a link, a video, etc. Alternatively and/or additionally, the first content item may be displayed on one or more locations of the internet resource (e.g., if the internet resource is the web page, the first content item may be displayed and/or presented on one or more locations of the web page and/or if the internet resource is the application, the first content item may be displayed and/or presented on one or more locations of the application).

In some examples, the first content item may be displayed via the internet resource using one or more native advertising techniques. For example, a format and/or a style of the first content item may be visually similar to other content comprised within the internet resource. In an example where the internet resource corresponds to a news article platform displaying a list of news articles, a format and/or a style of the first content item may be configured to look similar to a news article item. In an example where the internet resource corresponds to a search interface displaying a list of search results, a format and/or a style of the first content item may be configured to look similar to a search result.

At 404, a first negative signal associated with the first content item may be received from the first client device. In some examples, the first negative signal may be indicative of the first content item being closed using the first client device. Alternatively and/or additionally, the first negative signal may be indicative of the first user not having an interest in the first content item. For example, the first negative signal may correspond to a request to not present and/or display the first content item. Alternatively and/or additionally, the first negative signal may correspond to a request to remove the first content item from the internet resource.

In some examples, the first negative signal may be received responsive to a selection of a first selectable input associated with the first content item. The first selectable input may be displayed via the internet resource. For example, the first selectable input may be displayed adjacent to the first content item. Alternatively and/or additionally, the first selectable input may be overlaid onto a portion of the first content item. In some examples, the first selectable input may comprise a selectable graphical object. For example, the first selectable input may comprise a representation of an exit button and/or a different graphic representative of closing and/or removing the first content item from the internet resource. Alternatively and/or additionally, the first selectable input may comprise text representative of closing and/or removing the first content item. For example, the first selectable input may comprise an "x" symbol and/or the first selectable input may be selected by one or more of clicking the first selectable input via the first client device (e.g., using a mouse), tapping the first selectable input via the first client device (e.g., using a touchscreen), etc.

In some examples, responsive to a selection of the first selectable input and/or responsive to receiving the first negative signal, the first content item may be removed from the first internet resource (e.g., the first content item may be hidden from view and/or the first content item may not be displayed). For example, responsive to a selection of the first selectable input and/or responsive to receiving the first negative signal, the first internet resource may be modified such that the first internet resource does not display the first content item. Alternatively and/or additionally, responsive to a selection of the first selectable input and/or responsive to receiving the first negative signal, a replacement content item may be displayed via the first internet resource, in place of the first content item.

Alternatively and/or additionally, responsive to a selection of the first selectable input and/or responsive to receiving the first negative signal, a feedback interface may be displayed via the first internet resource. One or more first user-inputted reasons associated with why the first user is not interested in and/or does not like the first content item (e.g., one or more reasons that the first user selected the first selectable input) may be received from the first client device via the feedback interface. For example, the one or more first user-inputted reasons may be determined based upon one or more selections of one or more selectable inputs corresponding to the one or more first user-inputted reasons. Alternatively and/or additionally, the one or more first user-inputted reasons may be determined based upon text inputted (by the first user) via a text area of the feedback interface.

In an example, the one or more first user-inputted reasons may be indicative of the first content item being offensive to the first user (e.g., the first content item may comprise text and/or one or more images offensive to the first user). In another example, the one or more first user-inputted reasons may be indicative of the first content item being irrelevant to the first user (e.g., the first content item may be associated with a topic that the first user does not have an interest in, the first content item may advertise an entity that the first user does not have an interest in, etc.). In another example, the one or more first user-inputted reasons may be indicative of the first user having seen the first content item (and/or content items similar to the first content item) previously (e.g., the first content item and/or content items similar to the first content item may have previously been presented via the first client device one or more times).

At 406, an indication of the first content item may be stored in the first user profile associated with the first client device. For example, the indication of the first content item may be stored in the first user profile responsive to receiving the first negative signal and/or the one or more first user-inputted reasons. In some examples, the first content item may be included in a list of negative content items of the first user profile. For example, the list of negative content items may be indicative of a plurality of content items, comprising the first content item, associated with negative signals received from the first client device (and/or a different client device associated with a user account of the first user). For example, responsive to presenting content items of the plurality of content items via the first client device, negative signals associated with the content items have been received from the first client device.

In some examples, responsive to receiving the first negative signal and/or responsive to including the first content item in the list of negative content items, the first content item may not be selected for transmission to the first client device. For example, responsive to receiving a request for content from the first client device after receiving the first negative signal, a content item, different than the first content item, may be selected for transmission to the first client device based upon the first content item being included in the list of negative content items. Alternatively and/or additionally, content items may be temporarily included in the first list of negative content items. For example, the first content item may be removed from the first list of negative content items a duration of time (e.g., one or more of two weeks, one month, etc.) after the first content item is included in the first list of negative content items. Accordingly, the first content item may be selected for transmission to the first client device after the duration of time after the first content item is included in the first list of negative content items.

Alternatively and/or additionally, the first user profile may comprise a list of negative topics. For example, the list of negative topics may be indicative of a plurality of topics associated with content items that are associated with negative signals received from the first client device. For example, responsive to presenting content items associated with the plurality of topics via the first client device, negative signals associated with the content items have been received from the first client device. For example, one or more first topics associated with the first content item may be determined. The one or more first topics may be determined by analyzing the first content item. Alternatively and/or additionally, the one or more first topics may be determined by analyzing first content information associated with the first content item. For example, the first content information may be indicative of one or more of the one or more first topics associated with the first content item, a first entity associated with the first content item, one or more products and/or one or more services associated with the first content item (e.g., the first entity may use the first content item to advertise the one or more products and/or the one or more services associated with the first entity), etc. In some examples, responsive to receiving the first negative signal and/or responsive to including the first content item in the list of negative content items, the one or more first topics may be included in the list of negative topics. In an example, the list of negative topics may comprise topics such as one or more of politics (e.g., political content), cars (e.g., content advertising cars), clothing, etc.

Alternatively and/or additionally, the first user profile may comprise a list of negative entities. For example, the list of negative entities may be indicative of a plurality of entities associated with content items that are associated with negative signals received from the first client device. For example, responsive to presenting content items associated with the plurality of entities via the first client device, negative signals associated with the content items have been received from the first client device. For example, the first entity associated with the first content item may be determined (e.g., the first content item may be provided to the content system for presentation via client devices by the first entity). In some examples, the first entity may be an advertiser, a company, a brand, an organization, etc. The first entity may be determined by analyzing the first content item. Alternatively and/or additionally, the first entity may be determined by analyzing the first content information associated with the first content item. In some examples, responsive to receiving the first negative signal and/or responsive to including the first content item in the list of negative content items, the first entity may be included in the list of negative entities. Alternatively and/or additionally, the first entity may be included in the list of negative entities responsive to receiving a threshold quantity of negative signals associated with content items that are associated with the first entity. For example, the first entity may be included in the list of negative entities responsive to receiving, from the first client device, the threshold quantity of negative signals (e.g., 5 negative signals, 10 negative signals, etc.) associated with content items provided by the first entity that are presented via the first client device.

Alternatively and/or additionally, the first user profile may be indicative of a plurality of user-inputted reasons associated with negative signals received responsive to content items (e.g., content items of the plurality of content items) being presented via the first client device. In an example where the one or more first user-inputted reasons (associated with the first negative signal) are received from the first client device, the one or more first user-inputted reasons may be stored in the first user profile and/or included in the plurality of user-inputted reasons.

At 408, a second request for content associated with the first client device may be received. In some examples, the second request for content may be received responsive to the first client device accessing a second internet resource associated with the content system (e.g., one or more of a web page of a website associated with the content system, an application associated with the content system, an internet game associated with the content system, etc.). For example, the first client device may transmit a request to access the second internet resource to a third server associated with the second internet resource. Responsive to receiving the request to access the second internet resource, the third server associated with the second internet resource may transmit the second request for content to the content system (and/or to the second server associated with the content system). Alternatively and/or additionally, the second request for content may be received from the first client device. In some examples, the second request for content may correspond to a request to be provided with a content item (e.g., an advertisement, an image, a link, a video, etc.) for presentation via the second internet resource.

In some examples, responsive to receiving the second request for content, a bidding process may be performed to select a content item, from a second plurality of content items participating in a second auction for selection of a content item to present via the first client device. At 410, responsive to receiving the second request for content, a plurality of bid values associated with the second plurality of content items may be determined. In some examples, the plurality of bid values may be determined based upon budgets (e.g., daily budgets) and/or target spend patterns associated with the second plurality of content items. For example, the plurality of bid values and/or the budgets may be received from devices associated with entities (e.g., advertisers, companies, brands, organizations, etc.) associated with the second plurality of content items.

In some examples, the plurality of bid values may comprise a first bid value associated with a second content item of the second plurality of content items. Alternatively and/or additionally, the plurality of bid values may comprise a second bid value associated with a third content item of the second plurality of content items.

At 412, a first probability of receiving a negative signal associated with the second content item from the first client device responsive to presenting the second content item via the first client device may be determined. In some examples, the first probability may correspond to a probability of the second content item being closed if the second content item is presented via the first client device (e.g., via the second internet resource). In some examples, the first probability may be determined based upon the first user profile.

At 414, a second probability of receiving a negative signal associated with the third content item from the first client device responsive to presenting the third content item via the first client device may be determined. In some examples, the second probability may correspond to a probability of the third content item being closed if the third content item is presented via the first client device (e.g., via the second internet resource). In some examples, the second probability may be determined based upon the first user profile.

For example, a plurality of probabilities (e.g., negative signal probabilities) of receiving negative signals associated with the second plurality of content items may be determined. A probability of the plurality of probabilities may correspond to a probability of receiving a negative signal associated with a content item of the second plurality of content items responsive to presenting the content item via the first client device (e.g., the probability may correspond to a probability of the content item being closed if the content item is presented via the first client device). The plurality of probabilities may comprise the first probability and/or the second probability.

The plurality of probabilities associated with the second plurality of content items may be determined based upon the first user profile. In some examples, the plurality of probabilities may be determined based upon the demographic information (e.g., age, gender, etc.) and/or the location information associated with the first user (e.g., the first user profile may be indicative of the demographic information and/or the location information). For example, the plurality of probabilities may be determined using the first user profile and/or other user profiles associated with other users that are determined to be related to the demographic information and/or the location information associated with the first user (e.g., similar ages, the same gender, the same region, etc.).

In some examples, the plurality of probabilities may be determined based upon the list of negative content items, of the first user profile, indicative of the plurality of content items associated with negative signals received from the first client device. For example, the first probability associated with the second content item may be determined based upon the list of negative content items. In some examples, the list of negative content items may be analyzed to determine whether the list of negative content items is indicative of the second content item (and/or whether the plurality of content items of the list of negative content items comprises the second content item). In an example where it is determined that the second content item is included in the list of negative content items, the first probability associated with the second content item may be higher than in an example where it is determined that the second content item is not included in the list of negative content items.

Alternatively and/or additionally, the second content item may be compared with the plurality of content items of the list of negative content items to determine a similarity between the second content item and content items of the plurality of content items. The similarity may be determined based upon a type of content item of the second content item (e.g., the type of content item may be indicative of the second content item comprising one or more of an image, a video, a link, etc.) matching (e.g., being related to) types of content of content items of the plurality of content items (associated with negative signals). Alternatively and/or additionally, the similarity may be determined based upon a topic of the second content item matching topics of content items of the plurality of content items. Alternatively and/or additionally, the similarity may be determined based upon a second entity associated with the second content item matching entities associated with content items of the plurality of content items. Alternatively and/or additionally, the similarity may be determined based upon one or more products and/or one or more services associated with the second content item (e.g., the second content item may be used to advertise and/or promote the one or more products and/or the one or more services) matching products and/or services associated with content items of the plurality of content items. In some examples, the first probability may be determined based upon the similarity (e.g., a higher similarity between the second content item and content items of the plurality of content items associated with negative signals may correspond to a higher probability of receiving a negative signal associated with the second content item from the first client device responsive to presenting the second content item via the first client device).

Alternatively and/or additionally, the plurality of probabilities associated with the second plurality of content items may be determined based upon the list of negative topics, of the first user profile, indicative of the plurality of topics associated with content items that are associated with negative signals received from the first client device. For example, the first probability associated with the second content item may be determined based upon the list of negative topics. In some examples, one or more second topics associated with the second content item may be determined. The one or more second topics may be determined by analyzing the second content item. Alternatively and/or additionally, the one or more second topics may be determined by analyzing second content information associated with the second content item. For example, the second content information may be indicative of one or more of the one or more second topics associated with the second content item, the second entity associated with the second content item, the one or more products and/or the one or more services associated with the second content item, etc. In some examples, the first probability associated with the second content item may be determined based upon whether the list of negative topics (e.g., the plurality of topics) comprises the one or more second topics (e.g., the first probability may be higher in an example where a topic of the one or more second topics is comprised within the list of negative topics as compared with an example where the list of negative topics does not comprise a topic of the one or more second topics).

Alternatively and/or additionally, the plurality of probabilities associated with the second plurality of content items may be determined based upon the list of negative entities, of the first user profile, indicative of the plurality of entities associated with content items that are associated with negative signals received from the first client device. For example, the first probability associated with the second content item may be determined based upon the list of negative entities. In some examples, the second entity associated with the second content item may be determined. The second entity may be determined by analyzing the second content item. Alternatively and/or additionally, the second entity may be determined by analyzing the second content information associated with the second content item. In some examples, the first probability associated with the second content item may be determined based upon whether the list of negative entities (e.g., the plurality of entities) comprises the second entity (e.g., the first probability may be higher in an example where the second entity is comprised within the list of negative entities as compared with an example where the list of negative entities does not comprise an entity of the one or more second entities).

Alternatively and/or additionally, the plurality of probabilities associated with the second plurality of content items may be determined based upon the plurality of user-inputted reasons associated with negative signals received responsive to content items being presented via the first client device. For example, the first probability associated with the second content item may be determined based upon the plurality of user-inputted reasons. Alternatively and/or additionally, an offensive score indicative of a probability that the second content item is offensive to the first user associated with the first client device may be determined. In some examples, the plurality of user-inputted reasons may be analyzed to identify one or more user-inputted reasons indicative of one or more content items offensive to the first user. The offensive score may be determined based upon the one or more user-inputted reasons. For example, responsive to identifying the one or more user-inputted reasons associated with the one or more content items offensive to the first user, the one or more content items offensive to the first user may be analyzed to determine one or more characteristics associated with the one or more content items offensive to the first user. For example, the one or more characteristics may be indicative of the one or more content items offensive to the first user comprising images and/or text having one or more of profanity, a violent nature, etc. The second content item may be analyzed based upon the one or more characteristics associated with the one or more content items offensive to the first user to determine the offensive score associated with the second content item. In some examples, the first probability associated with the second content item may be determined based upon the offensive score (e.g., a higher offensive score associated with the second content item may correspond to a higher probability of receiving a negative signal associated with the second content item from the first client device responsive to presenting the second content item via the first client device).

In some examples, the first user profile may be indicative of a plurality of content item actions (e.g., content item selections and/or content item impressions) associated with the first client device. For example, the plurality of content item actions may comprise selections, via the first client device, of content items presented via the first client device. For example, the selections of the content items presented via the first client device may be detected by monitoring user activity of the first client device. Alternatively and/or additionally, the selections of the content items presented via the first client device may be received from the first client device. A selection of a content item may correspond to a click associated with the content item. Alternatively and/or additionally, the plurality of content item actions may comprise content item impressions (e.g., instances where content items are presented via the first client device and/or instances where content items are consumed by the first user).

In some examples, the plurality of probabilities associated with the second plurality of content items may be determined based upon the plurality of content item actions. For example, the first probability associated with the second content item may be determined based upon the plurality of content item actions. For example, a plurality of selected content items may be determined based upon the plurality of content item actions. The plurality of selected content items may correspond to content items, presented via the first client device, that are selected (e.g., clicked) via the first client device. In some examples, a second similarity between the second content item and content items of the plurality of selected content items may be determined based upon the type of content item of the second content item matching types of content items of the plurality of selected content items. Alternatively and/or additionally, the second similarity may be determined based upon the one or more second topics associated with the second content item matching topics of content items of the plurality of selected content items. Alternatively and/or additionally, the second similarity may be determined based upon the second entity associated with the second content item matching entities associated with content items of the plurality of selected content items. Alternatively and/or additionally, the second similarity may be determined based upon the one or more products and/or the one or more services associated with the second content item matching products and/or services associated with content items of the plurality of selected content items. In some examples, the first probability may be determined based upon the second similarity (e.g., a lower similarity between the second content item and content items of the plurality of selected content items may correspond to a higher probability of receiving a negative signal associated with the second content item from the first client device responsive to presenting the second content item via the first client device).

In some examples, the plurality of probabilities associated with the second plurality of content items may be determined based upon a plurality of sets of historical information associated with the second plurality of content items. The plurality of sets of historical information may be comprised within a content item historical information database.

For example, the first probability associated with the second content item may be determined based upon a first set of historical information of the plurality of sets of historical information. The content item historical information database may be analyzed to identify a first set of historical information associated with the second content item. In some examples, the first set of historical information may be indicative of client devices used to present the second content item (e.g., the second content item may be transmitted to the client devices and/or the second content item may be presented via the client devices). Alternatively and/or additionally, the first set of historical information may be indicative of negative signals received in association with presenting the second content item via client devices. For example, the first set of historical information may be indicative of a quantity of content item impressions associated with the second content item, a quantity of client devices to which the second content item was transmitted and/or a quantity of negative signals received from client devices responsive to presenting the second content item via the client devices. In some examples, the first probability associated with the second content item may be determined based upon the quantity of content item impressions associated with the second content item, the quantity of client devices to which the second content item was transmitted and/or the quantity of negative signals received from client devices responsive to presenting the second content item via the client devices. Alternatively and/or additionally, a negative signal rate associated with the second content item may be determined based upon the first set of historical information associated with the second content item. For example, the negative signal rate may be indicative of a relationship (e.g., one or more of a proportion, a ratio, a percentage, etc.) between a quantity of instances that the second content item is presented via client devices and a quantity of instances that negative signals are received responsive to presenting the second content item. In some examples, a higher negative signal rate may correspond to a higher probability of receiving a negative signal associated with the second content item from the first client device responsive to presenting the second content item via the first client device.

In some examples, the plurality of probabilities associated with the second plurality of content items may be determined using a machine learning model, such as a latent factor model and/or a different type of machine learning model. For example, the machine learning model may determine the plurality of probabilities based upon the first user profile associated with the first client device, the plurality of sets of historical information associated with the second plurality of content items and/or content information associated with the second plurality of content items.

In some examples, a first click probability associated with the second content item may be determined based upon the first user profile and/or the second content information associated with the second content item. For example, the first click probability may correspond to a probability of receiving a selection of the second content item responsive to presenting the second content item via the first client device. Alternatively and/or additionally, the first click probability may correspond to a probability of receiving a positive signal responsive to presenting the second content item via the first client device. For example, the positive signal may be indicative of the second content item being consumed by the first user. Alternatively and/or additionally, the positive signal may be indicative of one or more user interactions with the second content item. Alternatively and/or additionally, the positive signal may be indicative of the second content item being presented (and/or the second content item being presented for longer than a threshold duration of time).

In some examples, the first click probability may be determined based upon the second content information, the plurality of content item actions and/or the plurality of selected content items. Alternatively and/or additionally, the first click probability may be determined based upon the first set of historical information. For example, the first set of historical information may be indicative of a first click rate associated with the second content item. The first click rate may be indicative of a relationship between (e.g., one or more of a proportion, a ratio, a percentage, etc.) a quantity of instances that the second content item is presented via client devices and a quantity of instances that selections of the second content item are received (responsive to presenting the second content item). The first click probability may be determined based upon the first click rate (e.g., a higher click rate associated with the second content item may correspond to a higher click probability associated with the second content item).

Alternatively and/or additionally, a second click probability associated with the third content item may be determined based upon the first user profile and/or third content information associated with the third content item. For example, the second click probability may correspond to a probability of receiving a selection of the third content item responsive to presenting the third content item via the first client device. Alternatively and/or additionally, the second click probability may correspond to a probability of receiving a positive signal responsive to presenting the third content item via the first client device. For example, the positive signal may be indicative of the third content item being consumed by the first user. Alternatively and/or additionally, the positive signal may be indicative of one or more user interactions with the third content item. Alternatively and/or additionally, the positive signal may be indicative of the third content item being presented (and/or the third content item being presented for longer than a threshold duration of time).

In some examples, the second click probability may be determined based upon the third content information, the plurality of content item actions and/or the plurality of selected content items. Alternatively and/or additionally, the second click probability may be determined based upon a second set of historical information, of the plurality of sets of historical information, associated with the third content item. For example, the second set of historical information may be indicative of a second click rate associated with the third content item. The second click rate may be indicative of a relationship between a quantity of instances that the third content item is presented via client devices and a quantity of instances that selections of the third content item are received (responsive to presenting the third content item). The second click probability may be determined based upon the second click rate (e.g., a higher click rate associated with the third content item may correspond to a higher click probability associated with the third content item).

For example, a plurality of click probabilities associated with the second plurality of content items may be determined. In some examples, the plurality of click probabilities may be determined using a machine learning model and/or using one or more machine learning techniques. For example, the machine learning model may determine the plurality of click probabilities based upon the first user profile associated with the first client device, the plurality of sets of historical information associated with the second plurality of content items and/or content information associated with the second plurality of content items. A click probability of the plurality of click probabilities may correspond to may correspond to a probability of receiving a selection of a content item responsive to presenting the content item via the first client device. The plurality of click probabilities may comprise the first click probability and/or the second click probability.

In some examples, a plurality of content item scores associated with the second plurality of content items may be generated based upon the plurality of bid values associated with the second plurality of content items, the plurality of probabilities of receiving negative signals associated with the second plurality of content items and/or the plurality of click probabilities associated with the second plurality of content items.

For example, at 416, a first content item score (of the plurality of content item scores) associated with the second content item, may be generated based upon the first bid value associated with the second content item, the first probability of receiving a negative signal associated with the second content item from the first client device responsive to presenting the second content item via the first client device and/or the first click probability associated with the second content item.

Alternatively and/or additionally, at 418, a second content item score (of the plurality of content item scores) associated with the third content item, may be generated based upon the second bid value associated with the third content item, the second probability of receiving a negative signal associated with the third content item from the first client device responsive to presenting the third content item via the first client device and/or the second click probability associated with the third content item.

In some examples, the first content item score associated with the second content item may be generated by performing one or more operations (e.g., mathematical operations) using the first bid value, the first probability of receiving a negative signal associated with the second content item and/or the first click probability. For example, a first value may be generated based upon the first click probability and/or the first bid value. For example, the first value may be generated by multiplying the first click probability with the first bid value (e.g., the first value may correspond to a product of the first click probability and the first bid value). In an example where the first click probability is 2% and/or the first bid value is 1 (e.g., $1.00), the first value may be equal to 0.02×1=0.02.

In some examples, a first reduction value may be generated based upon the first probability. The first reduction value may be generated by performing one or more operations (e.g., mathematical operations) using the first probability and/or a first negative signal loss value. The first negative signal loss value may be indicative of a loss associated with reception of a negative signal associated with the second content item. For example, the first negative loss value may be indicative of a revenue loss (e.g., a monetary amount of loss) incurred as a result of receiving a negative signal associated with the second content item responsive to presenting the second content item via the first client device. The first reduction value may be generated by multiplying the first probability with the first negative signal loss value (e.g., the first reduction value may correspond to a product of the first probability and the first negative signal loss value). The first reduction value may correspond to an expected loss associated with transmission of the second content item to client devices (and/or to the first client device). In an example where the first probability is 4% and/or the first negative signal loss value is 0.2 (e.g., $0.20), the first reduction value may be equal to 0.04×0.2=0.008.

In some examples, the first content item score may be generated by reducing the first value by the first reduction value. For example, the first content item score may be equal to firstClickProbability×firstBidValue−firstProbability×firstNegativeSignalLossValue. In an example, where the first click probability is 2%, the first bid value is 1 (e.g., $1.00), the first probability is 4% and/or the first negative signal loss value is 0.2 (e.g., $0.20), the first content item score may be equal to 0.02×1−0.04×0.2=0.012.

Alternatively and/or additionally, the second content item score associated with the third content item may be generated by performing one or more operations (e.g., mathematical operations) using the second bid value, the second probability of receiving a negative signal associated with the third content item and/or the second click probability. For example, a second value may be generated based upon the second click probability and/or the second bid value. For example, the second value may be generated by multiplying the second click probability with the second bid value.

In some examples, a second reduction value may be generated based upon the second probability. The second reduction value may be generated by performing one or more operations (e.g., mathematical operations) using the second probability and/or a second negative signal loss value. The second negative signal loss value may be indicative of a loss associated with reception of a negative signal associated with the third content item. For example, the second negative loss value may be indicative of a revenue loss (e.g., a monetary amount of loss) incurred as a result of receiving a negative signal associated with the third content item responsive to presenting the third content item via a client device. The second reduction value may be generated by multiplying the second probability with the second negative signal loss value. In some examples, the second content item score may be generated by reducing the second value by the second reduction value. The second reduction value may correspond to an expected loss associated with transmission of the third content item to client devices (and/or to the first client device).

In an example, a content item score, of the plurality of content item scores, associated with a content item of the second plurality of content items may be equal to clickProbability×bidValue−negativeProbability×negativeSignalLossValue, where clickProbability corresponds to a click probability, of the plurality of click probabilities, associated with the content item, bidValue corresponds to a bid value, of the plurality of bid values, associated with the content item, negativeProbability corresponds to a probability, of the plurality of probabilities, of receiving a negative signal associated with the content item from the first client device responsive to presenting the content item via the first client device, and/or negativeSignalLossValue corresponds to a negative signal loss value indicative of a revenue loss (e.g., a monetary amount of loss) incurred as a result of receiving a negative signal associated with the content item responsive to presenting the content item via a client device.

In some examples, a plurality of negative signal loss values associated with the second plurality of content items may have different values (e.g., the first negative signal loss value associated with the second content item may be different than the second negative signal loss value associated with the third content item). For example, a negative signal loss value of the plurality of negative signal loss values may be determined based upon the first user profile associated with the first client device, a content item associated with the negative signal loss value, content information associated with the content item, a set of historical information associated with the content item and/or a monetary arrangement between the content system (and/or an entity associated with the content system) and an entity associated with the content item for presenting the content item via client devices.

Alternatively and/or additionally, a single negative signal loss value may be associated with the second plurality of content items (e.g., the first negative signal loss value associated with the second content item and/or the second negative signal loss value associated with the third content item may be equal to the single negative signal loss value). For example, the single negative signal loss may be used to generate the plurality of content item scores associated with the second plurality of content items. In some examples, the single negative signal loss value may be determined based upon the first user profile associated with the first client device.

Alternatively and/or additionally, the single negative signal loss value may be determined based upon the second internet resource (associated with the second request for content). For example, a plurality of sets of internet resources may be associated with a second plurality of negative signal loss values. A set of internet resources of the plurality of sets of internet resources may be associated with a negative signal loss value of the second plurality of negative signal loss values. For example, a first set of internet resources of the plurality of sets of internet resources may be associated with a third negative signal loss value of the second plurality of negative signal loss values, a second set of internet resources of the plurality of sets of internet resources may be associated with a fourth negative signal loss value of the second plurality of negative signal loss values, etc. For example, responsive to a determination that the second internet resource is comprised within the first set of internet resources, the single negative signal loss value may be equal to the third negative signal loss value.

In some examples, a set of internet resources of the plurality of sets of internet resources may correspond to a platform associated with the content system. For example, the content system may provide a plurality of platforms, such as one or more of an email platform, a messaging platform, a news article platform, a multimedia platform (e.g., a platform for downloading, viewing and/or sharing content such as videos and/or audio), a finance information platform, a social media platform, a search platform (e.g., a platform for performing searches using a search engine), etc. For example, the first set of internet resources may correspond to pages of the email platform and/or the second set of internet resources may correspond to pages of the news article platform. A platform of the plurality of platforms may be associated with a negative signal loss value of the second plurality of negative signal loss values.

In some examples, a fifth negative signal loss value may be modified over time. The fifth negative signal loss value may be associated with one or more sets of internet resources of the plurality of sets of internet resources and/or one or more platforms of the plurality of platforms. For example, the fifth negative signal loss value may be applied to content item scores associated with auctions performed to select content items for presentation via client devices. For example, a first plurality of auctions (for selecting content items for presentation via client devices) may be performed with a negative signal loss value equal to 0 (e.g., a reduction value and/or a negative signal loss value may not be applied to content item scores generated via the first plurality of auctions). A second plurality of auctions (for selecting content items for presentation via client devices) may be performed with the fifth negative signal loss value (e.g., the second plurality of auctions may be performed by generating content item scores using the fifth negative signal loss value, as described herein). The first plurality of auctions may correspond to a first proportion (e.g., 10%) of a plurality of auctions (e.g., all auctions) performed during a period of time and/or the second plurality of auctions may correspond to a second proportion (e.g., 90%) of the plurality of auctions performed during the period of time. Responsive to receiving a request for content associated with an auction of the plurality of auctions, a determination may be randomly made to perform the auction using the fifth negative signal loss value (where the auction is included in the second plurality of auctions) or to perform the auction without applying a negative signal loss value (where the auction is included in the first plurality of auctions).

A first revenue (e.g., a baseline revenue) associated with the first plurality of auctions (e.g., a revenue for transmission of content items selected via the first plurality of auctions to client devices and/or a revenue for serving the content items to the client devices) may be determined. A second revenue associated with the second plurality of auctions (e.g., a revenue for transmission of content items selected via the second plurality of auctions to client devices and/or a revenue for serving the content items to the client devices) may be determined. The second revenue may be compared with the first revenue to determine a revenue difference.

In some examples, responsive to determining that the revenue difference is less than a revenue difference threshold and/or that the second revenue is less than the first revenue, the fifth negative signal loss value may be increased to generate a first modified negative signal loss value. For example, the first modified negative signal loss value may be used for generating content item scores associated with a third plurality of auctions during a second period of time after the period of time associated with the plurality of auctions.

Alternatively and/or additionally, responsive to determining that the revenue difference is greater than the revenue difference threshold and/or that the second revenue is less than the first revenue, the fifth negative signal loss may be decreased to generate a second modified negative signal loss value. For example, the second modified negative signal loss value may be used for generating content item scores associated with the third plurality of auctions during the second period of time after the period of time associated with the plurality of auctions.

Alternatively and/or additionally, responsive to determining that the revenue difference is equal to about the revenue difference threshold and/or that the second revenue is less than the first revenue, the fifth negative signal loss may not be modified. For example, the fifth negative signal loss value may be used for generating content item scores associated with the third plurality of auctions during the second period of time after the period of time associated with the plurality of auctions.

At 420, the third content item (and/or a different content item) may be selected from the second plurality of content items for presentation via the first client device. For example, the third content item may be selected for presentation via the first client device based upon the plurality of content item scores. In some examples, the third content item may be selected for presentation via the first client device responsive to analyzing the plurality of content item scores associated with the second plurality of content items to determine that the second content item score associated with the third content item is higher than other content item scores of the plurality of content item scores and/or that the second content item score is a highest content item score of the plurality of content item scores.

At 422, the third content item may be transmitted to the first client device. The third content item may be transmitted to the first client device responsive to selecting the third content item from the second plurality of content items for presentation via the first client device. In some examples, the third content item may be presented via the first client device responsive to selecting the third content item for presentation via the first client device and/or responsive to transmitting the third content item to the first client device. In some examples, the third content item may be one or more of an advertisement, an image, a link, a video, etc. Alternatively and/or additionally, the third content item may be displayed on one or more locations of the second internet resource (e.g., if the second internet resource is a web page, the third content item may be displayed and/or presented on one or more locations of the web page and/or if the second internet resource is an application, the third content item may be displayed and/or presented on one or more locations of the application). In some examples, the third content item may be displayed via the second internet resource via one or more native advertising techniques.

In some examples, a price associated with transmission of the third content item to the first client device may be determined. In some examples, the price may be determined using one or more first price auction type techniques (e.g., the second auction performed responsive to receiving the second request for content may be associated with a first price auction type). In some examples, the price may be determined based upon the second bid value associated with the third content item. For example, the price may be equal to the second bid value.

Alternatively and/or additionally, the price may be determined using one or more generalized second price (GSP) auction type techniques (e.g., the second auction may be associated with a GSP auction type). In some examples, a runner-up content item of the second plurality of content items may be identified. The runner-up content item may be associated with a second highest content item score of the plurality of content item scores (e.g., a content item score associated with the runner-up content item may be lower than the second content item score associated with the third content item score and/or the content item score may be higher than other content item scores, of the plurality of content item scores, not including the second content item score).

In some examples, the price may be determined based upon the second click probability associated with the third content item, a third click probability (of the plurality of click probabilities) associated with the runner-up content item, a third bid value (of the plurality of bid values) associated with the runner-up content item, the second negative signal loss value associated with the third content item, a sixth negative signal loss value associated with the runner-up content item, the second probability associated with the third content item and/or a third probability (of the plurality of probabilities) of receiving a negative signal associated with the runner-up content item from the first client device responsive to presenting the runner-up content item via the first client device. For example, the price may be equal to $$\frac{thirdClickProb \times thirdBid - thirdProb \times sixthSignalLossValue + secondProb \times secondSignalLossValue}{secondClickProb},$$

where thirdClickProb corresponds to the third click probability associated with the runner-up content item, thirdBid corresponds to the third bid value associated with the runner-up content item, thirdProb corresponds to the third probability associated with the runner-up content item, sixthSignalLossValue corresponds to the sixth negative signal loss value associated with the runner-up content item, secondProb corresponds to the second probability associated with the third content item, secondSignalLossValue corresponds to the second negative signal loss value associated with the third content item and/or secondClickProb corresponds to the second click probability associated with the third content item. In some examples, the price may be less than or equal to the second bid value associated with the third content item.

In some systems, a second price may be determined using one or more second GSP auction type techniques, different than the one or more GSP auction type techniques. For example, the second price may be equal to $$\frac{thirdClickProb \times thirdBid}{secondClickProb}.$$

In some examples, if a first product of the second probability and the second negative signal loss value (e.g., a first expected loss associated with the third content item) is greater than a second product of the third probability and the sixth negative signal loss value (e.g., a second expected loss associated with the runner-up content item), the price may be greater than the second price. Alternatively and/or additionally, if the first product is less than the second product, the price may be less than the second price. Accordingly, a third entity associated with the third content item may be motivated to increase a quality of content items for presentation via client devices such that probabilities associated with receiving negative signals are reduced and/or such that prices associated with transmission of the content items are reduced.

In some examples, the price may correspond to an amount that the third entity associated with the third content item may be charged for one or more of transmitting the third content item to the first client device, presenting the third content item via the first client device and/or via the second internet resource, receiving a selection of the third content item via the second internet resource, etc. For example, an invoice, indicative of the price, may be generated and/or transmitted to a device associated with the third entity.

It may be appreciated that by applying one or more of the techniques provided herein, such as selecting content items based upon probabilities of receiving negative signals, a generalized revenue (e.g., a revenue for presenting content items via client devices subtracted by a loss incurred as a result of receiving negative signals and/or content items being closed via client devices) may be increased and/or losses incurred as a result of receiving negative signals may be reduced. Alternatively and/or additionally, by applying one or more of the techniques provided herein, such as selecting content items based upon probabilities of receiving negative signals, entities may be motivated to increase a quality of content items for presentation via client devices such that probabilities associated with receiving negative signals are reduced and/or such that prices associated with transmission of the content items are reduced.

FIGS. 5A-5F illustrate examples of a system 501 for selecting content for transmission to devices. A first user, such as user Jennifer, (and/or a first client device 500 associated with the first user) may access and/or interact with a service, such as a browser, software, a website, an application, an operating system, an email interface, a messaging interface, a music-streaming application, a video application, etc. that provides a platform for viewing and/or downloading content from a server associated with a content system.

Figure 5A:
FIG. 5A is a component block diagram illustrating an example system for selecting content for transmission to devices, where a first client device presents and/or accesses a first web page using a browser of the first client device.

FIG. 5A illustrates the first client device 500 presenting and/or accessing a first web page 508 using a browser of the first client device 500. The browser may comprise an address bar 502 comprising a web address (e.g., a URL) of the first web page 508. The first web page 508 may comprise a search interface. For example, the search interface may comprise a web search engine designed to search for information throughout the internet. In some examples, the first web page 508 may comprise a search field 506. For example, a query "stock market" may be entered into the search field 506. In some examples, the first web page 508 may comprise a search selectable input 504 corresponding to performing a search based upon the query. For example, the search selectable input 504 may be selected.

Figure 5B:
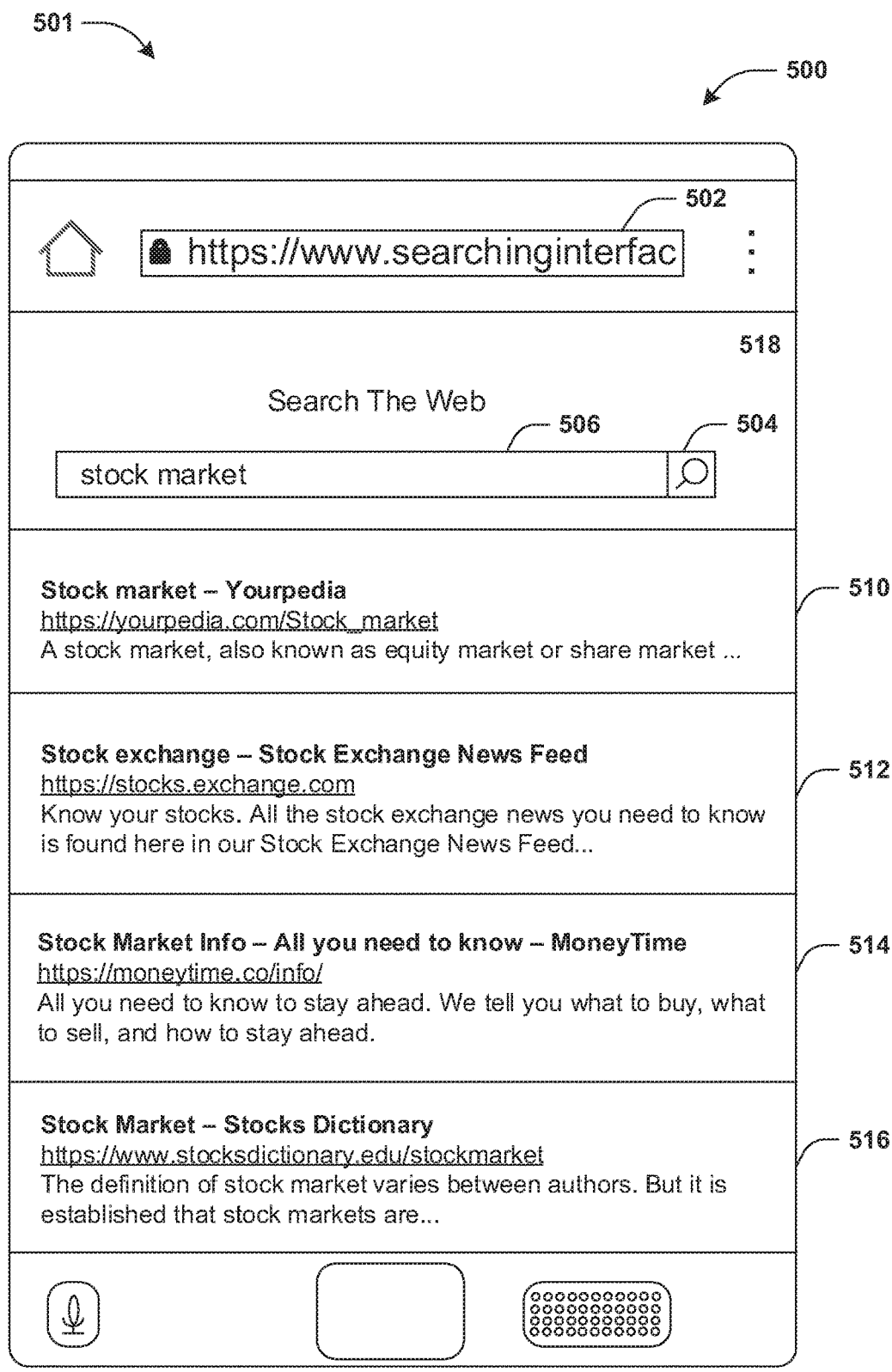
FIG. 5B is a component block diagram illustrating an example system for selecting content for transmission to devices, where a first client device presents a plurality of search results associated with a query using a browser of the first client device.

FIG. 5B illustrates the first client device 500 presenting a plurality of search results associated with the query using the browser of the first client device 500. For example, the plurality of search results may be presented within a second web page 518. For example, the plurality of search results may comprise a first search result 510 corresponding to a third web page, a second search result 512 corresponding to a fourth web page 588 (illustrated in FIG. 5F), a third search result 514 corresponding to a fifth web page and/or a fourth search result 516 corresponding to a sixth web page.

In some examples, each search result of the plurality of search results may comprise a selectable input (e.g., a link) corresponding to accessing a web page associated with the search result. In some examples, the second search result 512 corresponding to the fourth web page 588 may be selected (e.g., the second search result 512 may be selected via a second selectable input corresponding to the second search result 512).

Figure 5C:
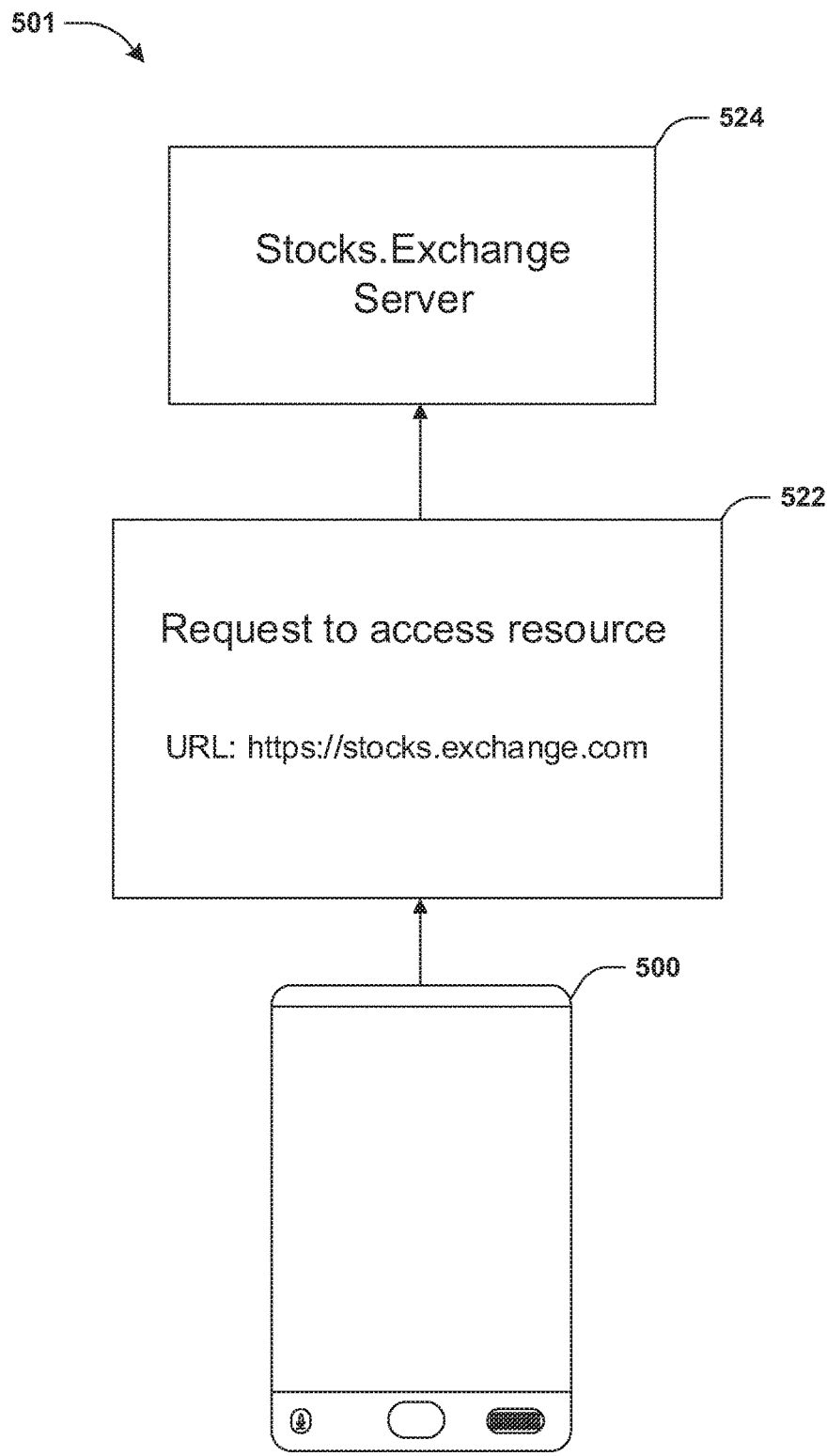
FIG. 5C is a component block diagram illustrating an example system for selecting content for transmission to devices, where a first client device transmits a request to access a resource to a first server.

FIG. 5C illustrates the first client device 500 transmitting a request to access a resource 522 to a first server 524. In some examples, the request to access the resource 522 may be transmitted responsive to the second search result 512 being selected. For example, the resource may correspond to the fourth web page 588. For example, the request to access the resource 522 may comprise an indication of the fourth web page 588 (e.g., a web address "https://stocks.exchange- .com"). Alternatively and/or additionally, the first server 524 may be associated with the fourth web page 588.

Figure 5D:
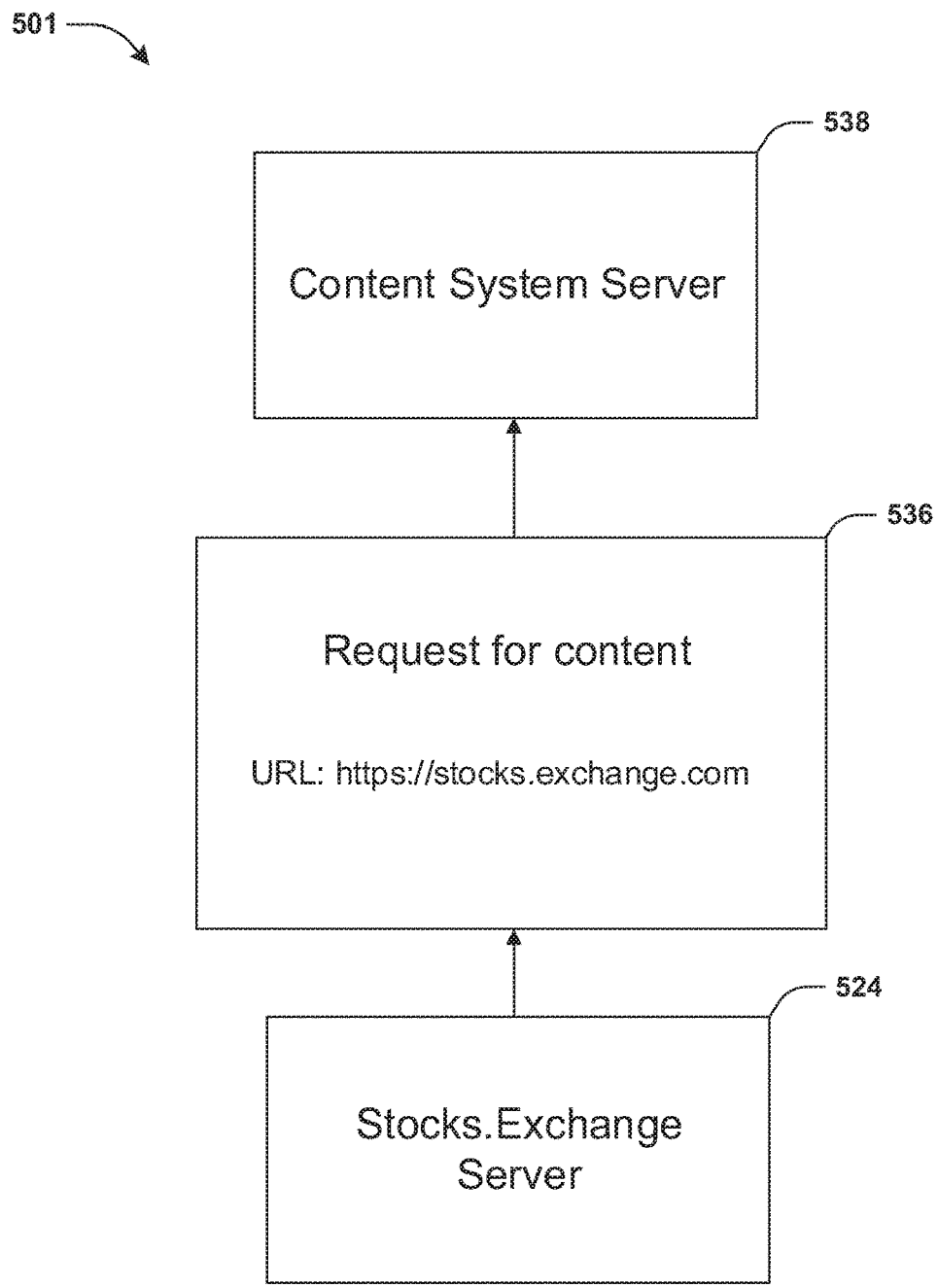
FIG. 5D is a component block diagram illustrating an example system for selecting content for transmission to devices, where a first server transmits a request for content to a second server associated with a content system.

FIG. 5D illustrates the first server 524 transmitting a request for content 536 to a second server 538 associated with the content system. In some examples, the request for content 536 may be transmitted (by the first server 524) responsive to receiving the request to access the resource 522. Alternatively and/or additionally, the request for content 536 may be transmitted (to the second server 538) by the first client device 500. In some examples, the request for content 536 may be a request to be provided with a content item (e.g., an advertisement, an image, a link, a video, etc.) (for presentation via the fourth web page 588).

Figure 5E:
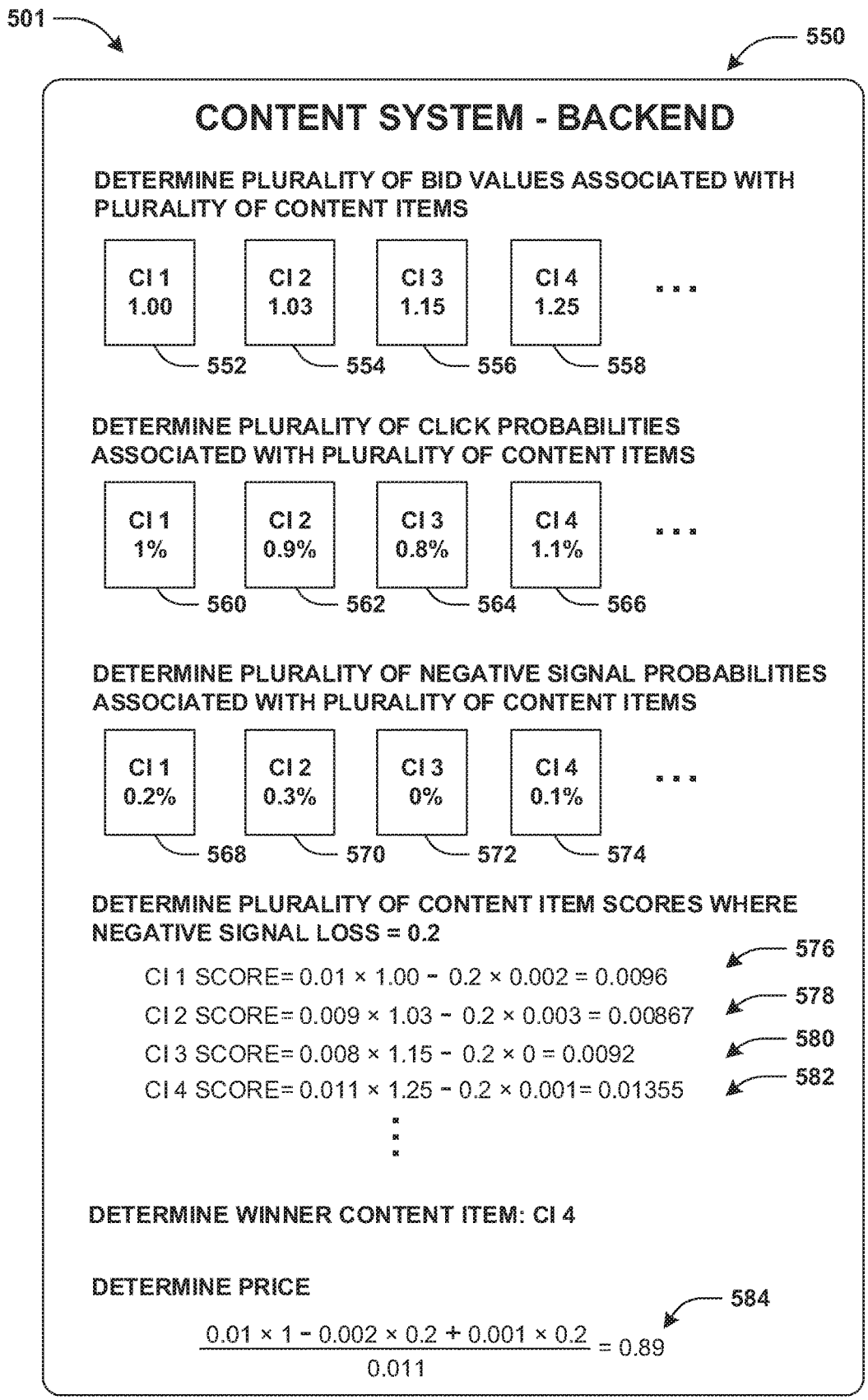
FIG. 5E is a component block diagram illustrating an example system for selecting content for transmission to devices, where a backend system selects a content item for presentation via a first client device.

FIG. 5E illustrates a backend system 550 (of the content system) selecting a content item for presentation via the first client device 500. For example, a bidding process may be performed (by the backend system 550) to select a content item from a plurality of content items participating in an auction.

A plurality of bid values associated with the plurality of content items may be determined. For example, a first bid value 552 (e.g., 1.00) associated with a first content item (e.g., "CI 1") of the plurality of content items may be determined, a second bid value 554 (e.g., 1.03) associated with a second content item (e.g., "CI 2") of the plurality of content items may be determined, a third bid value 556 (e.g., 1.15) associated with a third content item (e.g., "CI 3") of the plurality of content items may be determined, a fourth bid value 558 (e.g., 1.25) associated with a fourth content item (e.g., "CI 4") of the plurality of content items may be determined, and/or one or more other bid values associated with one or more other content items of the plurality of content items may be determined.

Alternatively and/or additionally, a plurality of click probabilities associated with the plurality of content items may be determined. For example, a first click probability 560 (e.g., 1%) associated with the first content item of the plurality of content items may be determined, a second click probability 562 (e.g., 0.9%) associated with the second content item of the plurality of content items may be determined, a third click probability 564 (e.g., 0.8%) associated with the third content item of the plurality of content items may be determined, a fourth click probability 566 (e.g., 1.1%) associated with the fourth content item of the plurality of content items may be determined, and/or one or more other click probabilities associated with one or more other content items of the plurality of content items may be determined.

Alternatively and/or additionally, a plurality of negative signal probabilities associated with the plurality of content items may be determined. A negative signal probability of the plurality of negative signal probabilities may correspond to a probability of receiving a negative signal associated with a content item of the plurality of content items responsive to presenting the content item via the first client device 500 (e.g., the negative signal probability may correspond to a probability of the content item being closed if the content item is presented via the first client device 500). For example, a first negative signal probability 568 (e.g., 0.2%) associated with the first content item of the plurality of content items may be determined, a second negative signal probability 570 (e.g., 0.3%) associated with the second content item of the plurality of content items may be determined, a third negative signal probability 572 (e.g., 0%) associated with the third content item of the plurality of content items may be determined, a fourth negative signal probability 574 (e.g., 0.1%) associated with the fourth content item of the plurality of content items may be determined, and/or one or more other negative signal probabilities associated with one or more other content items of the plurality of content items may be determined.

In some examples, the plurality of click probabilities and/or the plurality of negative signal probabilities may be determined based upon historical content item information associated with the plurality of content items and/or based upon a first user profile associated with the first client device 500 (and/or associated with a first user account associated with the first client device 500 and/or the first user).

In some examples, a plurality of content item scores associated with the plurality of content items may be determined. For example, the plurality of content item scores may be determined based upon the plurality of bid values, the plurality of click probabilities and/or the plurality of negative signal probabilities. For example, a content item score, of the plurality of content item scores, associated with a content item of the plurality of content items may be equal to clickProbability×bidValue−negativeProbability×negativeSignalLossValue, where clickProbability corresponds to a click probability, of the plurality of click probabilities, associated with the content item, bidValue corresponds to a bid value, of the plurality of bid values, associated with the content item, negativeProbability corresponds to a negative signal probability, of the plurality of negative signal probabilities, of receiving a negative signal associated with the content item from the first client device 500 responsive to presenting the content item via the first client device 500, and/or negativeSignalLossValue corresponds to a negative signal loss value, where the negative signal loss value is equal to 0.2.

For example, a first content item score 576 (e.g., 0.0096) (associated with the first content item) of the plurality of content item scores may be determined, a second content item score 578 (e.g., 0.00867) (associated with the second content item) of the plurality of content item scores may be determined, a third content item score 580 (e.g., 0.0092) (associated with the third content item) of the plurality of content item scores may be determined, a fourth content item score 582 (e.g., 0.01355) (associated with the fourth content item) of the plurality of content item scores may be determined and/or one or more other content item scores associated with one or more other content items of the plurality of content items may be determined.

In some examples, the fourth content item may be selected from the plurality of content items for presentation via the first client device 500. For example, the fourth content item may be selected for presentation via the first client device 500 based upon the plurality of content item scores. In some examples, the fourth content item may be selected for presentation via the first client device 500 responsive to analyzing the plurality of content item scores associated with the plurality of content items to determine that the fourth content item score associated with the fourth content item is higher than other content item scores of the plurality of content item scores and/or that the fourth content item score is a highest content item score of the plurality of content item scores.

In some examples, a price 584 associated with transmission of the third content item to the first client device may be determined. Alternatively and/or additionally, the price 584 may be determined using one or more GSP auction type techniques. In some examples, it may be determined that the first content item is a runner-up content item of the plurality of content items. For example, it may be determined that the first content item is the runner-up content item based upon a determination that the first content item score 576 is a second highest content item score of the plurality of content item scores.

In some examples, the price 584 may be determined based upon the first click probability 560 associated with the first content item, the fourth click probability 566 associated with the fourth content item, the first bid value 552 associated with the first content item, the negative signal loss value, the first negative signal probability 568 associated with the first content item and/or the fourth negative signal probability 574 associated with the fourth content item. For example, the price 584 may be equal to $$\frac{firstClickProb \times firstBid - firstProb \times signalLossValue + fourthProb \times signalLossValue}{fourthClickProb},$$

where firstClickProb corresponds to the first click probability 560 (e.g., 1%) associated with the first content item, firstBid corresponds to the first bid value 552 (e.g., 1.00) associated with the first content item, firstProb corresponds to the first negative signal probability 568 (e.g., 0.2%) associated with the first content item, signalLossValue corresponds to the negative signal loss value (e.g., 0.2), fourthProb corresponds to the fourth negative signal probability 574 (e.g., 0.1%) associated with the fourth content item, and/or fourthClickProb corresponds to the fourth click probability 566 (e.g., 1.1%) associated with the fourth content item. In some examples, it may be determined that the price 584 is equal to 0.89 (e.g., $0.89).

Figure 5F:
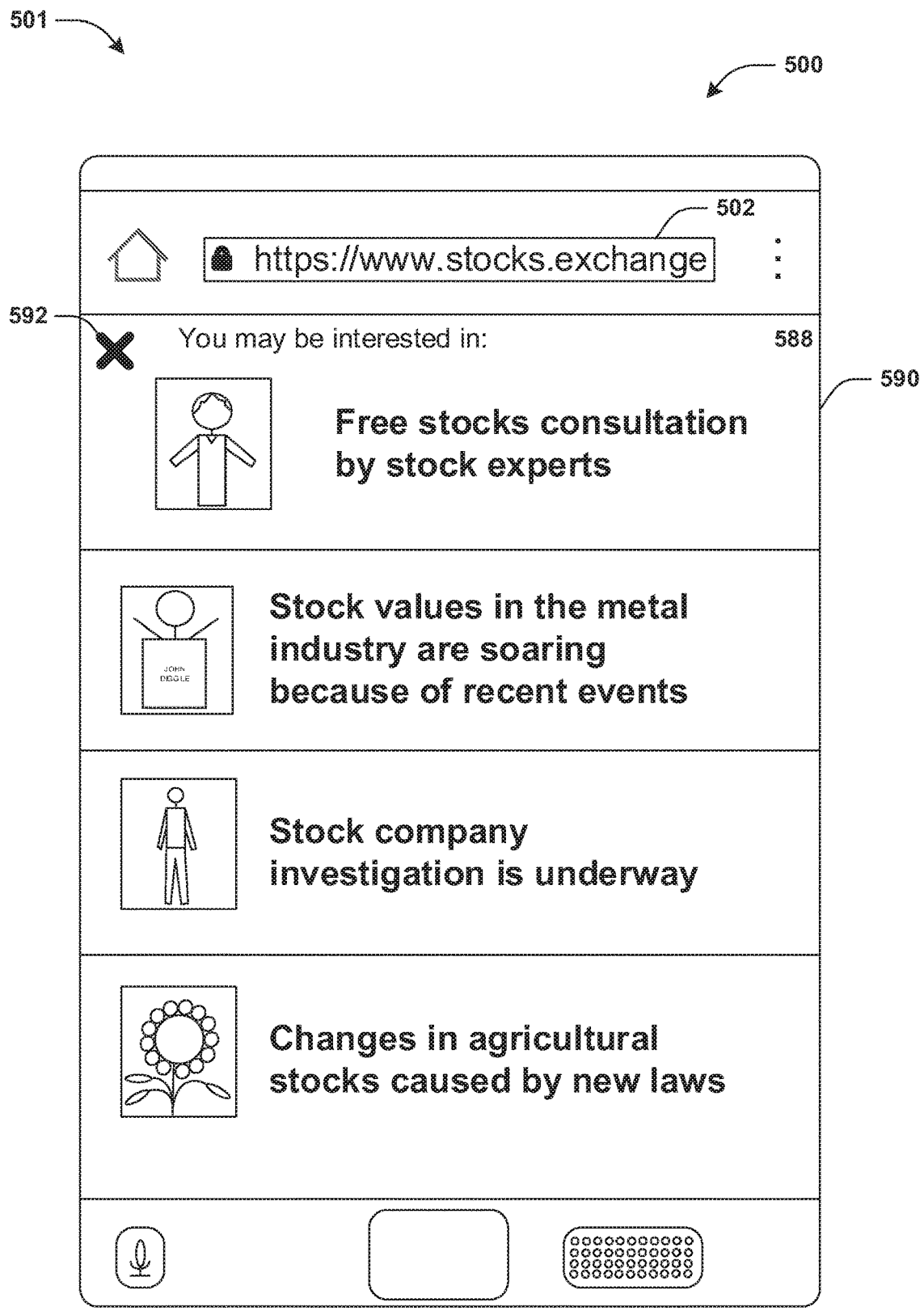
FIG. 5F is a component block diagram illustrating an example system for selecting content for transmission to devices, where a first client device presents and/or accesses a fourth web page using a browser of the first client device.

In some examples, responsive to selecting the fourth content item for presentation via the first client device 500, the fourth content item may be transmitted to the first client device 500 for presentation via the fourth web page 588. FIG. 5F illustrates the first client device 500 presenting and/or accessing the fourth web page 588 using the browser of the first client device 500. For example, the content system may provide the fourth content item to be presented via the fourth web page 588 while the fourth web page 588 is accessed by the first client device 500.

For example, the fourth content item may comprise an advertisement 590. The advertisement 590 may be displayed via the fourth web page 588 using one or more native advertising techniques. For example, a format and/or a style of the advertisement 590 may be visually similar to other content comprised within the fourth web page 588 (e.g., the fourth web page 588 may comprise a list of news article items and/or a format and/or a style of the advertisement 590 may be visually similar to news article items of the list of news article items).

A third selectable input 592 (e.g., "X") may be displayed adjacent to and/or overlaying the advertisement 590. For example, responsive to a selection of the third selectable input 592, a negative signal may be received from the first client device 500. For example, the negative signal may correspond to a request to not present and/or display the advertisement 590 (e.g., hide the advertisement 590 from view). Alternatively and/or additionally, the negative signal may correspond to a request to remove the advertisement 590 from the fourth web page 588. In some examples, responsive to a selection of the third selectable input 592 and/or responsive to receiving the negative signal, the advertisement 590 may be hidden from view and/or the advertisement 590 may not be displayed (e.g., the advertisement 590 may be closed).

It may be appreciated that the disclosed subject matter may assist a user (and/or a client device associated with the user) in receiving and/or consuming content that the user may have an interest in. For example, the content selected for transmission to the client device may be selected based upon a probability of receiving a negative signal associated with the content responsive to presenting the content via the client device. Accordingly, a probability that the user is not interested in the content (and/or that the user will not close the content) may be reduced.

Implementation of at least some of the disclosed subject matter may lead to benefits including, but not limited to, a reduction in negative signals received from client devices, a reduction in losses incurred as a result of receiving negative signals and/or content items being closed via client devices, an increase in generalized revenue for presenting content items via client devices, etc.

Alternatively and/or additionally, implementation of at least some of the disclosed subject matter may lead to benefits including a more accurate determination of content item scores associated with content items (e.g., as a result of determining negative signal probabilities associated with receiving negative signals from client devices, determining expected losses associated with content items based upon negative signal probabilities and/or negative signal loss values, determining content item scores based upon the expected losses, etc.). The more accurate determination of content item scores associated with content items may also lead to a more accurate and/or appropriate selection of a content item for presentation via a client device that has a lower probability of resulting in the content item being closed and/or a negative signal being received.

Alternatively and/or additionally, implementation of at least some of the disclosed subject matter may lead to benefits including a reduction in bandwidth (e.g., as a result of reducing probabilities of receiving negative signals associated with content items being closed, such that fewer replacement content items (to be displayed in place of closed content items) are transmitted to client devices).

In some examples, at least some of the disclosed subject matter may be implemented on a client device, and in some examples, at least some of the disclosed subject matter may be implemented on a server (e.g., hosting a service accessible via a network, such as the Internet).

Figure 6:
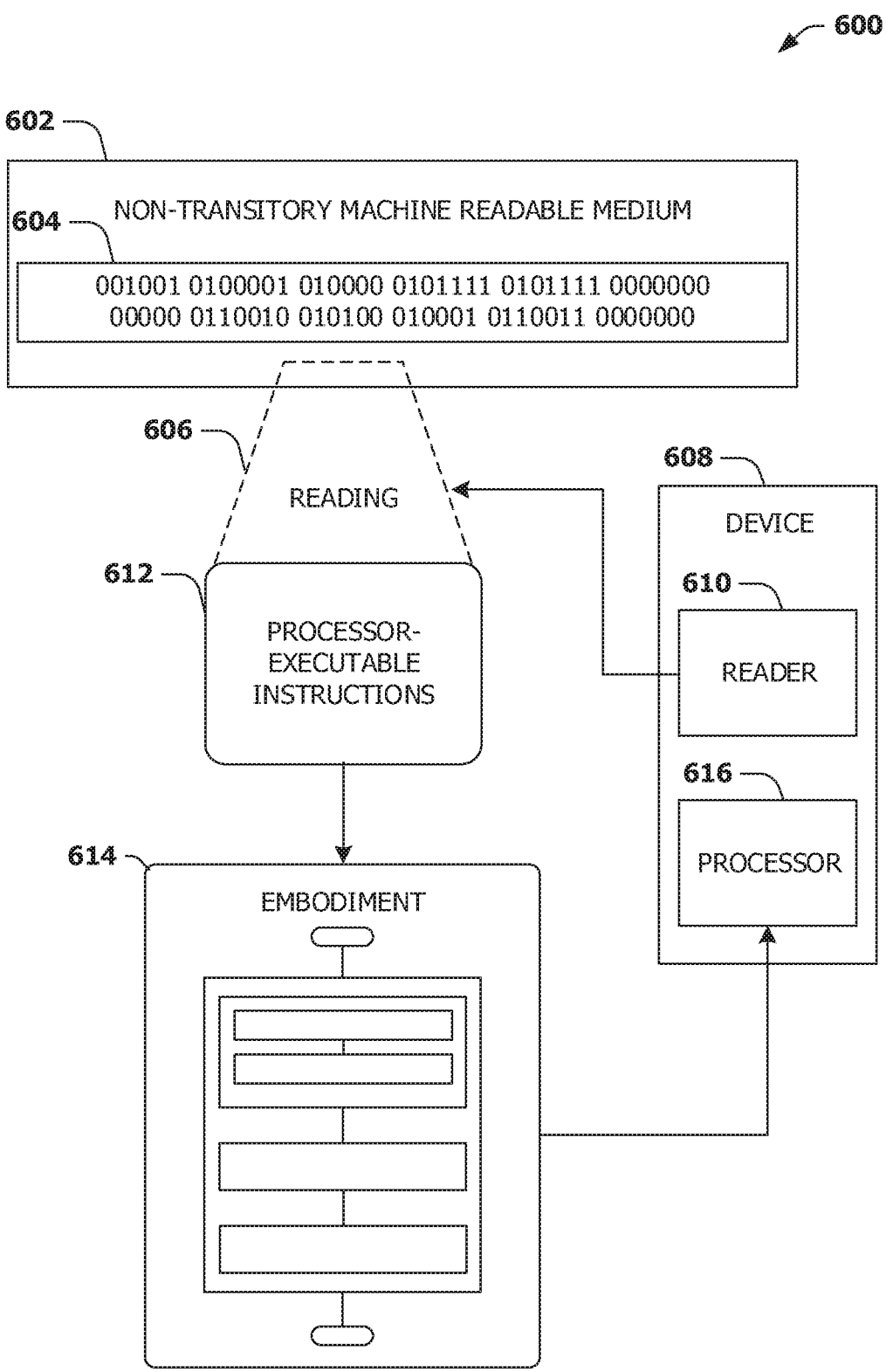
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIGS. 4A-4B, for example. In some embodiments, the processor-executable instructions 612 are configured to cause implementation of a system, such as at least some of the example system 501 of FIGS. 5A-5F, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:

presenting, via a first client device, a first content item;

receiving, from the first client device, a first negative signal associated with the first content item;

storing an indication of the first content item in a first user profile associated with the first client device, wherein:
the first user profile is indicative of a plurality of content items associated with negative signals received from the first client device; and
the first content item is included in the plurality of content items;

receiving a first request for content associated with the first client device;

responsive to receiving the first request for content, determining a plurality of bid values associated with a second plurality of content items, wherein the plurality of bid values comprises a first bid value associated with a second content item of the second plurality of content items and a second bid value associated with a third content item of the second plurality of content items;

determining, based upon the first user profile, a first probability of receiving a negative signal associated with the second content item from the first client device responsive to presenting the second content item via the first client device;

determining, based upon the first user profile, a second probability of receiving a negative signal associated with the third content item from the first client device responsive to presenting the third content item via the first client device;

determining a first negative signal loss value indicative of a loss associated with reception of a negative signal associated with the second content item;

generating a first reduction value based upon the first probability and the first negative signal loss value;

generating, based upon the first reduction value and the first bid value, a first content item score, of a plurality of content item scores associated with the second plurality of content items, associated with the second content item;

determining a second negative signal loss value indicative of a loss associated with reception of a negative signal associated with the third content item;
generating a second reduction value based upon the second probability and the second negative signal loss value;
generating, based upon the second reduction value and the second bid value, a second content item score, of the plurality of content item scores, associated with the third content item;
selecting, based upon the plurality of content item scores, the third content item from the second plurality of content items for presentation via the first client device;
formatting the third content item selected based upon the plurality of content item scores to be visually similar to one or more other content comprised within a list of content items in an internet resource within which the third content item is to be presented, wherein the formatting comprises (i) identifying text of the third content item and an image of the third content item, (ii) formatting the text of the third content item to generate formatted text visually similar to text of the one or more other content, (iii) formatting the image of the third content item to generate a formatted image visually similar in size to one or more images of the one or more other content, and (iv) generating a formatted third content item that arranges the formatted text of the third content item and the formatted image of the third content item in a manner that is visually similar to arrangements of the text of the one or more other content and the one or more images of the one or more other content; and
presenting the formatted third content item within the internet resource to the first client device.

2. The method of claim 1, comprising:
analyzing a content item historical information database to identify first historical information associated with the second content item, wherein:
the first historical information is indicative of negative signals received in association with presenting the second content item via client devices; and
the determining the first probability is performed based upon the first historical information; and
analyzing the content item historical information database to identify second historical information associated with the third content item, wherein:
the second historical information is indicative of negative signals received in association with presenting the third content item via client devices; and
the determining the second probability is performed based upon the second historical information.

3. The method of claim 1, comprising:
determining, based upon at least one of first content information indicative of one or more first topics associated with the second content item or the first user profile, a first click probability associated with the first client device and the second content item; and
determining, based upon at least one of second content information indicative of one or more second topics associated with the third content item or the first user profile, a second click probability associated with the first client device and the third content item.

4. The method of claim 3, wherein:
the generating the first content item score is performed based upon the first click probability; and
the generating the second content item score is performed based upon the second click probability.

5. The method of claim 3, wherein:
the generating the first content item score associated with the second content item comprises:
generating, based upon the first click probability and the first bid value, a first value;
generating, based upon the first probability, a first reduction value; and
reducing the first value by the first reduction value to generate the first content item score; and
the generating the second content item score associated with the third content item comprises:
generating, based upon the second click probability and the second bid value, a second value;
generating, based upon the second probability, a second reduction value; and
reducing the second value by the second reduction value to generate the second content item score.

6. The method of claim 1, wherein the formatting comprises:
formatting the third content item selected based upon the plurality of content item scores to be visually similar to a search result comprised within a list of search results in a search interface within which the third content item is to be presented.

7. The method of claim 1, wherein the first negative signal loss value is equal to the second negative signal loss value.

8. The method of claim 1, wherein the first negative signal loss value is not equal to the second negative signal loss value.

9. The method of claim 1, wherein the third content item is selected from the second plurality of content items for presentation via the first client device responsive to analyzing the plurality of content item scores associated with the second plurality of content items to determine that the second content item score associated with the third content item is higher than other content item scores of the plurality of content item scores.

10. The method of claim 1, comprising:
identifying a runner-up content item, of the second plurality of content items, associated with a second highest content item score of the plurality of content item scores; and
determining a price associated with transmission of the third content item to the first client device based upon a first click probability associated with the third content item, a second click probability associated with the runner-up content item, a third bid value associated with the runner-up content item, the second probability and a third probability of receiving a negative signal associated with the runner-up content item from the first client device responsive to presenting the runner-up content item via the first client device.

11. The method of claim 1, comprising:
determining a price associated with transmission of the third content item to the first client device based upon the second bid value associated with the third content item.

12. The method of claim 1, wherein the first negative signal is indicative of the first content item being closed via the first client device.

13. A computing device comprising:
a processor; and
memory comprising processor-executable instructions that when executed by the processor cause performance of operations, the operations comprising:
receiving a first request for content associated with a first client device, wherein the first client device is associated with a first user profile indicative of a plurality of content items associated with negative signals received from the first client device;

responsive to receiving the first request for content, determining a plurality of bid values associated with a second plurality of content items, wherein the plurality of bid values comprises a first bid value associated with a first content item of the second plurality of content items and a second bid value associated with a second content item of the second plurality of content items;

determining, based upon the first user profile, a first probability of receiving a negative signal associated with the first content item from the first client device responsive to presenting the first content item via the first client device;

determining, based upon the first user profile, a second probability of receiving a negative signal associated with the second content item from the first client device responsive to presenting the second content item via the first client device;

determining a first negative signal loss value indicative of a loss associated with reception of a negative signal associated with the first content item;

generating a first reduction value based upon the first probability and the first negative signal loss value;

generating, based upon the first reduction value and the first bid value, a first content item score, of a plurality of content item scores associated with the second plurality of content items, associated with the first content item;

determining a second negative signal loss value indicative of a loss associated with reception of a negative signal associated with the second content item;

generating a second reduction value based upon the second probability and the second negative signal loss value;

generating, based upon the second reduction value and the second bid value, a second content item score, of the plurality of content item scores, associated with the second content item;

selecting, based upon the plurality of content item scores, the second content item from the second plurality of content items for presentation via the first client device;

formatting the second content item selected based upon the plurality of content item scores to be visually similar to one or more other content comprised within a list of content items in an internet resource within which the second content item is to be presented, wherein the formatting comprises (i) identifying text of the second content item and an image of the second content item, (ii) formatting the text of the second content item to generate formatted text visually similar to text of the one or more other content, (iii) formatting the image of the second content item to generate a formatted image visually similar in size to one or more images of the one or more other content, and (iv) generating a formatted second content item that arranges the formatted text of the second content item and the formatted image of the second content item in a manner that is visually similar to arrangements of the text of the one or more other content and the one or more images of the one or more other content; and transmitting the formatted second content item to the first client device.

14. The computing device of claim 13, the operations comprising:
analyzing a content item historical information database to identify first historical information associated with the first content item, wherein:
the first historical information is indicative of negative signals received in association with presenting the first content item via client devices; and
the determining the first probability is performed based upon the first historical information; and
analyzing the content item historical information database to identify second historical information associated with the second content item, wherein:
the second historical information is indicative of negative signals received in association with presenting the second content item via client devices; and
the determining the second probability is performed based upon the second historical information.

15. The computing device of claim 13, the operations comprising:
determining, based upon at least one of first content information indicative of one or more first topics associated with the first content item or the first user profile, a first click probability associated with the first client device and the first content item; and
determining, based upon at least one of second content information indicative of one or more second topics associated with the second content item or the first user profile, a second click probability associated with the first client device and the second content item.

16. The computing device of claim 15, wherein:
the generating the first content item score is performed based upon the first click probability; and
the generating the second content item score is performed based upon the second click probability.

17. A non-transitory machine readable medium having stored thereon processor-executable instructions that when executed cause performance of operations, the operations comprising:
presenting, via a first client device, a first content item;
receiving, from the first client device, a first negative signal associated with the first content item;
storing an indication of the first content item in a first user profile associated with the first client device, wherein:
the first user profile is indicative of a plurality of content items associated with negative signals received from the first client device; and
the first content item is included in the plurality of content items;
receiving a first request for content associated with the first client device;
responsive to receiving the first request for content, determining a plurality of bid values associated with a second plurality of content items, wherein the plurality of bid values comprises a first bid value associated with a second content item of the second plurality of content items and a second bid value associated with a third content item of the second plurality of content items;
determining, based upon the first user profile, a first probability of receiving a negative signal associated with the second content item from the first client device responsive to presenting the second content item via the first client device;
determining, based upon the first user profile, a second probability of receiving a negative signal associated with the third content item from the first client device responsive to presenting the third content item via the first client device;

determining a first negative signal loss value indicative of a loss associated with reception of a negative signal associated with the second content item;

generating a first reduction value based upon the first probability and the first negative signal loss value;

generating, based upon the first reduction value and the first bid value, a first content item score, of a plurality of content item scores associated with the second plurality of content items, associated with the second content item;

determining a second negative signal loss value indicative of a loss associated with reception of a negative signal associated with the third content item;

generating a second reduction value based upon the second probability and the second negative signal loss value;

generating, based upon the second reduction value and the second bid value, a second content item score, of the plurality of content item scores, associated with the third content item;

selecting, based upon the plurality of content item scores, the third content item from the second plurality of content items for presentation via the first client device;

formatting the third content item selected based upon the plurality of content item scores to be visually similar to one or more other content comprised within a list of content items in an internet resource within which the third content item is to be presented, wherein the formatting comprises (i) identifying text of the third content item and an image of the third content item, (ii) formatting the text of the third content item to generate formatted text visually similar to text of the one or more other content, (iii) formatting the image of the third content item to generate a formatted image visually similar in size to one or more images of the one or more other content, and (iv) generating a formatted third content item that arranges the formatted text of the third content item and the formatted image of the third content item in a manner that is visually similar to arrangements of the text of the one or more other content and the one or more images of the one or more other content; and transmitting the formatted third content item to the first client device.

18. The non-transitory machine readable medium of claim 17, the operations comprising:

analyzing a content item historical information database to identify first historical information associated with the second content item, wherein:
  the first historical information is indicative of negative signals received in association with presenting the second content item via client devices; and
  the determining the first probability is performed based upon the first historical information; and analyzing the content item historical information database to identify second historical information associated with the third content item, wherein:
  the second historical information is indicative of negative signals received in association with presenting the third content item via client devices; and
  the determining the second probability is performed based upon the second historical information.

19. The non-transitory machine readable medium of claim 17, the operations comprising:

determining, based upon at least one of first content information indicative of one or more first topics associated with the second content item or the first user profile, a first click probability associated with the first client device and the second content item; and determining, based upon at least one of second content information indicative of one or more second topics associated with the third content item or the first user profile, a second click probability associated with the first client device and the third content item.

20. The non-transitory machine readable medium of claim 19, wherein:

the generating the first content item score is performed based upon the first click probability; and the generating the second content item score is performed based upon the second click probability.

* * * * *